(12) United States Patent
Zhang

(10) Patent No.: US 12,402,112 B2
(45) Date of Patent: Aug. 26, 2025

(54) COMMUNICATION METHOD AND APPARATUS TO IMPROVE A RANDOM ACCESS SUCCESS RATE OF A TERMINAL DEVICE

(71) Applicant: Huawei Technologies Co., Ltd., Shenzhen (CN)

(72) Inventor: Xiangdong Zhang, Shenzhen (CN)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 322 days.

(21) Appl. No.: 17/940,471

(22) Filed: Sep. 8, 2022

(65) Prior Publication Data

US 2023/0007698 A1    Jan. 5, 2023

Related U.S. Application Data

(63) Continuation of application No. PCT/CN2021/077241, filed on Feb. 22, 2021.

(30) Foreign Application Priority Data

Mar. 13, 2020    (CN) .......................... 202010177768.1

(51) Int. Cl.
| | | |
|---|---|---|
| H04W 74/0833 | (2024.01) | |
| H04W 72/0453 | (2023.01) | |
| H04W 74/00 | (2009.01) | |
| H04W 28/20 | (2009.01) | |
| H04W 74/0836 | (2024.01) | |

(52) U.S. Cl.
CPC ... H04W 74/0833 (2013.01); H04W 72/0453 (2013.01); H04W 74/002 (2013.01); H04W 28/20 (2013.01); H04W 74/0836 (2024.01)

(58) Field of Classification Search
CPC ......... H04W 74/0833; H04W 72/0453; H04W 74/002; H04W 28/20
See application file for complete search history.

(56) References Cited

U.S. PATENT DOCUMENTS

| | | | |
|---|---|---|---|
| 10,349,394 B2 * | 7/2019 | Zhang | ................. H04W 74/085 |
| 11,611,994 B2 * | 3/2023 | Xu | ..................... H04W 74/0833 |

(Continued)

FOREIGN PATENT DOCUMENTS

| | | |
|---|---|---|
| CN | 107690173 A | 2/2018 |
| CN | 109152083 A | 1/2019 |

(Continued)

OTHER PUBLICATIONS

3GPP TS 36.212 V16.0.0, Dec. 2019, 3rd Generation Partnership Project; Technical Specification Group Radio Access Network; Evolved Universal Terrestrial Radio Access (E-UTRA); Multiplexing and channel coding (Release 16) 250 pages.

(Continued)

*Primary Examiner* — Mounir Moutaouakil
(74) *Attorney, Agent, or Firm* — Conley Rose, P.C.

(57) ABSTRACT

This disclosure relates to a communication method and apparatus. A first terminal device determines a first resource. The first terminal device sends a first random access message on the first resource. A bandwidth of the first resource is less than or equal to a channel bandwidth of the first terminal device. The channel bandwidth of the first terminal device is less than or equal to a channel bandwidth of a second terminal device. The channel bandwidth of the second terminal device is greater than or equal to a first bandwidth. The first bandwidth is configured by a network device. For example, the first random access message is a Msg3 or a MsgA.

20 Claims, 7 Drawing Sheets

(56) References Cited

U.S. PATENT DOCUMENTS

| | | | | |
|---|---|---|---|---|
| 12,108,331 | B2* | 10/2024 | Xie | H04W 52/0216 |
| 2017/0245250 | A1* | 8/2017 | Zhang | H04L 5/0094 |
| 2017/0332404 | A1* | 11/2017 | Wang | H04W 72/0453 |
| 2018/0049068 | A1 | 2/2018 | Agiwal et al. | |
| 2018/0206271 | A1* | 7/2018 | Chatterjee | H04W 72/21 |
| 2019/0182872 | A1 | 6/2019 | Chen | |
| 2019/0223227 | A1* | 7/2019 | Jiang | H04W 74/0833 |
| 2020/0296650 | A1* | 9/2020 | Zuo | H04W 40/22 |
| 2020/0374840 | A1 | 11/2020 | Takeda et al. | |
| 2022/0167428 | A1 | 5/2022 | Mu | |

FOREIGN PATENT DOCUMENTS

| | | |
|---|---|---|
| CN | 109565876 A | 4/2019 |
| CN | 110495192 A | 11/2019 |
| WO | 2020033695 A1 | 2/2020 |

OTHER PUBLICATIONS

3GPP TS 38.101-1 V15.8.2, Dec. 2019, "3rd Generation Partnership Project; Technical Specification Group Radio Access Network; NR; User Equipment (UE) radio transmission and reception; Part 1: Range 1 Standalone (Release 15)," 236 pages.

3GPP TS 38.101-2 V16.2.0, Dec. 2019, "3rd Generation Partnership Project; Technical Specification Group Radio Access Network; NR; User Equipment (UE) radio transmission and reception; Part 2: Range 2 Standalone (Release 16)," 157 pages.

3GPP TS 38.211 V16.0.0, Dec. 2019, "3rd Generation Partnership Project; Technical Specification Group Radio Access Network; NR; Physical channels and modulation (Release 16)," 129 pages.

3GPP TS 38.212 V16.0.0, Dec. 2019, "3rd Generation Partnership Project; Technical Specification Group Radio Access Network; NR; Multiplexing and channel coding (Release 16)," 145 pages.

3GPP TS 38.214 V16.0.0, Dec. 2019, "3rd Generation Partnership Project; Technical Specification Group Radio Access Network; NR; Physical layer procedures for data(Release 16)," 147 pages.

3GPP TS 38.331 V15.8.0, Dec. 2019, "3rd Generation Partnership Project; Technical Specification Group Radio Access Network; NR; Radio Resource Control (RRC) protocol specification (Release 15)," 532 pages.

R2-1702890, Samsung, Random Access in NR-Flexible UE Bandwidth Aspects, 3GPP TSG-RAN WG2 Meeting #97bis, Spokane, USA, Apr. 3-7, 2017, 5 pages.

R4-1909102, Huawei et al., On the bandwidth ofi initial Bwp, 3GPP TSG-RAN WG4 Meeting #92, Ljubljana, Slovenia, Aug. 26-30, 2019, 5 pages.

* cited by examiner

COMMUNICATION METHOD AND APPARATUS TO IMPROVE A RANDOM ACCESS SUCCESS RATE OF A TERMINAL DEVICE

CROSS-REFERENCE TO RELATED APPLICATIONS

This is a continuation of International Patent Application No. PCT/CN2021/077241 filed on Feb. 22, 2021, which claims priority to Chinese Patent Application No. 202010177768.1 filed on Mar. 13, 2020. The disclosures of the aforementioned applications are herein incorporated by reference in their entireties.

TECHNICAL FIELD

This disclosure relates to the field of communication technologies, and in particular, to a communication method and apparatus.

BACKGROUND

Before communicating with a network device, a terminal device needs to first access the network device through a random access procedure. In the random access procedure, a first terminal device needs to send a third message (Msg3) to the network device. Based on current specifications, a bandwidth of a resource for carrying the Msg3 may reach a bandwidth of an initial bandwidth part (BWP). The bandwidth of the initial BWP is configured based on a system information block (SIB) (for example, a SIB1), and is generally configured to be large, for example, 20 megabits per second (Mbps).

In addition to some first terminal devices with proper functions, there are some terminal devices with a limited capability, for example, New Radio (NR) light terminal devices or reduced capability (REDCAP) devices. An NR light terminal device may have a limited bandwidth, and may, for example, support a maximum bandwidth of 5 Mbps or 10 Mbps. In this case, a channel bandwidth of the terminal device may be less than the bandwidth of the initial BWP. If the bandwidth of the resource for carrying the Msg3 is greater than the channel bandwidth of the terminal device, the terminal device cannot send the Msg3 to the network device. Consequently, the terminal device cannot complete random access.

SUMMARY

Embodiments of this disclosure provide a communication method and apparatus, to improve a random access success rate of a first terminal device.

According to a first aspect, a first communication method is provided. The method includes determining a first resource, and sending a first random access message on the first resource. A bandwidth of the first resource is less than or equal to a channel bandwidth of a first terminal device. The channel bandwidth of the first terminal device is less than or equal to a channel bandwidth of a second terminal device. The channel bandwidth of the second terminal device is greater than or equal to a first bandwidth. The first bandwidth is configured by a network device.

The method may be performed by a first communication apparatus. The first communication apparatus may be a communication device, or may be a communication apparatus, for example, a chip, that can support the communication device in implementing a function required in the method. For example, the first communication apparatus is a terminal device, a chip that is disposed in the terminal device and that functions as the terminal device, or another component configured to implement the function of the terminal device. The following description process uses an example in which the first communication apparatus is the first terminal device.

In this embodiment of this disclosure, when sending the first random access message, the first terminal device may determine a resource whose bandwidth is less than or equal to the channel bandwidth of the first terminal device as the first resource. For example, the first random access message is a Msg3 or a message A (MsgA). If the bandwidth of the first resource is supported by the first terminal device, the first terminal device can properly send the Msg3 or the MsgA. According to the technical solution provided in this embodiment of this disclosure, even a terminal device with a limited capability can send the Msg3 or the MsgA. Therefore, the technical solution provided in this embodiment of this disclosure can improve a random access success rate of the terminal device.

In an optional implementation, the first resource is a part of a second resource. The second resource is used by the second terminal device to send a first random access message. A bandwidth of the second resource is less than or equal to the first bandwidth.

The second resource may include one or more resources. That the bandwidth of the second resource is less than or equal to the channel bandwidth of the second terminal device is that a bandwidth of each of the one or more resources is less than or equal to the channel bandwidth of the second terminal device. For example, there are five resources that can be used by a terminal device to send a first random access message, and the five resources belong to the second resource. If a bandwidth of each of two of the five resources is less than or equal to the channel bandwidth of the first terminal device, the first terminal device may select one of the two resources as the first resource. The second terminal device may select the second resource to send the first random access message, or may select the first resource to send the first random access message. For example, the second terminal device may select one of the five resources to send the first random access message, or may select one of the two resources to send the first random access message. This is equivalent to that although a resource that can be selected by the first terminal device is specified, resource selection of the second terminal device is not affected, and optional resources for the second terminal device are not reduced. This can improve resource usage.

In an optional implementation, the method further includes sending a random access request message on a third resource, where the third resource is a part of a fourth resource, and the fourth resource is used by the second terminal device to send a random access request message, and receiving a random access response message, where the random access response message is used for scheduling the first resource.

If a random access procedure is a 4-step random access channel (RACH) procedure, the first random access message may be a Msg3. Before sending the Msg3 to the network device, the first terminal device may send the random access request message to the network device on the third resource, and the network device receives the random access request message from the first terminal device on the third resource. For example, the random access request message is a Msg1, namely, a preamble. In addition, if the Msg3 is initially transmitted, after receiving the random access request message, the network device may send the random access response message to the first terminal device, and the first terminal device receives the random access response message from the network device. The random access response message may be used for scheduling the first resource. In this way, the first terminal device may determine the first resource after receiving the random access response message. For example, the random access response message is a Msg2, namely, a random access response (RAR) message. The third resource may be a part of a fourth resource. The fourth resource may be used by the second terminal device to send a Msg1. A bandwidth of the fourth resource may be less than or equal to the channel bandwidth of the second terminal device (which may be an uplink channel bandwidth of the second terminal device herein). In addition, the bandwidth of the fourth resource may also be less than or equal to the bandwidth of the initial BWP (which may be the bandwidth of the initial uplink BWP herein).

In an optional implementation, the third resource is a random access resource corresponding to a first random access occasion, the first random access occasion is one of N random access occasions, a bandwidth of a resource that is corresponding to each of the N random access occasions and that is used for sending a first random access message is less than or equal to the channel bandwidth of the first terminal device, the third resource is one of M random access resources, and a bandwidth of a resource that is corresponding to each of the M random access resources and that is used for sending a first random access message is less than or equal to the channel bandwidth of the first terminal device, or the third resource is one of K random access resources, the K random access resources are corresponding to H random access occasions, the H random access occasions belong to P random access occasions, and a bandwidth of a resource that is corresponding to each of the K random access resources and that is used for sending a first random access message is less than or equal to the channel bandwidth of the first terminal device.

N, M, K, H, and P are all integers greater than or equal to 1, and H is less than or equal to P.

In this embodiment of this disclosure, for example, in the 4-step RACH procedure, corresponding resources for sending the random access request message may be preset (for example, the resources that are preset are referred to as preset resources). In addition, it is specified that a bandwidth of a resource that is corresponding to each of the preset resources and that is used for sending the first random access message is less than or equal to the channel bandwidth of the first terminal device (the channel bandwidth of the first terminal device may include an uplink channel bandwidth and a downlink channel bandwidth, and mainly refers to the uplink channel bandwidth of the first terminal device herein). In other words, the bandwidth of the resource that is corresponding to each of the preset resources and that is used for sending the first random access message (for example, a Msg3) is less than or equal to the channel bandwidth of the first terminal device. After receiving the random access request message from the first terminal device, the network device determines that a random access resource for sending the random access request message belongs to the preset resources. In this case, the network device may select a resource whose bandwidth is less than or equal to the channel bandwidth of the first terminal device when allocating, to the first terminal device, the resource for sending the first random access message. The resource for sending the random access request message is preset, so that the resource that is scheduled by the network device and that is used for sending the first random access message can meet a capability requirement of the first terminal device, to improve a success rate of sending the first random access message by the terminal device.

In an optional implementation, the method further includes receiving a first downlink message from the network device. The first downlink message includes specific configuration information of the first terminal device. The specific configuration information is used for configuring a specific parameter.

After accessing the network device, the first terminal device needs to perform communication under coverage of the network device. In this case, the network device further needs to configure corresponding specific parameters for the first terminal device, so that the first terminal device can perform communication under the coverage of the network device based on the specific parameters. For example, the network device may send, to the first terminal device, the first downlink message that includes the specific configuration information for configuring the specific parameter, so that the first terminal device can obtain the specific configuration information.

In an optional implementation, the specific configuration information includes configuration information of a specific BWP. A bandwidth of the specific BWP is less than or equal to the channel bandwidth of the first terminal device.

The specific configuration information may include the configuration information of the specific BWP. For example, the bandwidth of the specific BWP allocated by the network device to the first terminal device may be less than or equal to the bandwidth of the first terminal device, so that the bandwidth of the specific BWP can meet the capability requirement of the first terminal device.

In an optional implementation, the third resource is used for determining the specific parameter, and the third resource is used for sending the random access request message, the first resource is used for determining the specific parameter, the first random access message includes first information, and the first information is used for determining the specific parameter, or the method further includes sending a first uplink message to the network device, where the first uplink message includes first information, and the first information is used for determining the specific parameter.

The first information includes type information of the first terminal device and/or type information of a service, and the service is a service supported by the first terminal device.

For example, in the 4-step RACH procedure, it is specified in advance that specific parameters corresponding to the preset resources are limited configuration parameters. After receiving the random access request message, the network device determines that the third resource for sending the random access request message belongs to the preset resources. In this case, the specific parameter allocated by the network device to the first terminal device may be the limited configuration parameter. For example, the bandwidth of the specific BWP allocated to the first terminal device may be less than or equal to the channel bandwidth of the first terminal device. In this case, it may be considered that the network device determines the specific parameter of the first terminal device based on the third resource. Alternatively, for example, in a 2-step RACH procedure, it is specified in advance that specific parameters corresponding to G resources preconfigured by the network device are limited configuration parameters. After receiving the first random access message, the network device determines that the first resource for sending the first random access message belongs to the G resources. In this case, the specific parameter allocated by the network device to the first terminal device may be the limited configuration parameter. For example, the bandwidth of the specific BWP allocated to the first terminal device may be less than or equal to the channel bandwidth of the first terminal device. In this case, it may be considered that the network device determines the specific parameter of the first terminal device based on the first resource. In the foregoing two cases, the first terminal device does not need to additionally send information to the network device, and the network device may configure the specific parameter for the first terminal device based on the corresponding resource. This helps reduce signaling overheads.

Alternatively, if the first random access message may include the first information, the network device may configure the specific parameter for the first terminal device based on the first information. For example, the first information indicates that the first terminal device is a bandwidth-limited first terminal device. In this case, the specific parameter configured by the network device for the first terminal device based on the first information may be the limited configuration parameter. For example, the bandwidth of the specific BWP may be less than or equal to the channel bandwidth of the first terminal device. Alternatively, the first terminal device sends the first information to the network device based on another message (the first uplink message) instead of the first random access message. In this case, the network device may also configure the specific parameter for the first terminal device based on the first information. In the foregoing two cases, the first terminal device may send the first information to the network device, and the network device may configure the specific parameter for the first terminal device based on the first information, so that the specific parameter configured by the network device can better meet the capability requirement of the first terminal device.

In an optional implementation, the third resource is a random access resource whose subcarrier spacing is adjusted. A bandwidth of the third resource existing before the subcarrier spacing is adjusted is greater than the channel bandwidth of the first terminal device.

To enable the bandwidth-limited terminal device to support more random access resources and improve a random access success rate of the bandwidth-limited terminal device, subcarrier spacings of random access resources on some random access occasions may be adjusted, so that the adjusted random access resources can meet a requirement of the bandwidth-limited terminal device. For example, the third resource may be a random access resource whose subcarrier spacing is not adjusted, or may be a random access resource whose subcarrier spacing is adjusted. If the third resource is a random access resource whose subcarrier spacing is adjusted, before the subcarrier spacing of the third resource is adjusted, the bandwidth of the third resource may be greater than the channel bandwidth of the first terminal device. In other words, before the subcarrier spacing is adjusted, the bandwidth-limited terminal device may not support the third resource, but after the subcarrier spacing is adjusted, the bandwidth-limited terminal device can support the third resource. The subcarrier spacing is adjusted, so that more resource options are provided for the bandwidth-limited terminal device to send the random access request message, to expand a resource selection range of the bandwidth-limited terminal device and also improve a resource selection success rate.

In an optional implementation, the channel bandwidth of the first terminal device includes the uplink channel bandwidth and the downlink channel bandwidth. The method further includes determining that the uplink channel bandwidth of the first terminal device is greater than or equal to a third bandwidth, and/or that the downlink channel bandwidth of the first terminal device is greater than or equal to a second bandwidth, where the third bandwidth is a bandwidth for sending a random access request message in a first cell covered by the network device, and the second bandwidth is a bandwidth of a control resource set 0, and determining that the first terminal device can access the first cell.

A bandwidth of the random access resource used by the first terminal device to send the random access request message is the third bandwidth. In this case, provided that the uplink channel bandwidth of the first terminal device is greater than or equal to the third bandwidth, the first terminal device can send the random access request message. A bandwidth of a resource used by the first terminal device to receive a random access response message is the bandwidth of a control resource set 0 (CORESET #0). Therefore, provided that the downlink channel bandwidth of the first terminal device is greater than or equal to the second bandwidth, the first terminal device can receive the random access response message. If the first terminal device can send a random access request message in a cell and/or can receive a random access response message in the cell, this means that the first terminal device can access the cell. Therefore, if the first terminal device determines that the uplink channel bandwidth of the first terminal device is greater than or equal to the third bandwidth, and/or determines that the downlink channel bandwidth of the first terminal device is greater than or equal to the second bandwidth, it may be determined that the first terminal device can access the first cell. In this manner, the first terminal device does not need to perform determining based on the bandwidth of the initial BWP. This improves a cell access success rate of the bandwidth-limited terminal device. In addition, the bandwidth-limited terminal device is less limited when selecting a cell. Therefore, more terminal devices can access a cell.

In an optional implementation, the method further includes receiving a system message in the first cell, and determining the second bandwidth and the third bandwidth based on the system message.

The second bandwidth and the third bandwidth may be configured based on the system message, or may be configured based on another message.

In an optional implementation, the bandwidth of the control resource set 0 is less than or equal to the first bandwidth.

For example, the first bandwidth is the bandwidth of the initial BWP. The bandwidth of the control resource set 0 may be generally less than or equal to the bandwidth of the initial BWP.

According to a second aspect, a second communication method is provided. The method includes receiving a first random access message from a first terminal device on a first resource, where a bandwidth of the first resource is less than or equal to a channel bandwidth of the first terminal device, the channel bandwidth of the first terminal device is less than or equal to a channel bandwidth of a second terminal device, the channel bandwidth of the second terminal device is greater than or equal to a first bandwidth, and the first bandwidth is configured by a network device, and sending a first downlink message to the first terminal device, where the first downlink message includes specific configuration information, and the specific configuration information is used for configuring a specific parameter.

The method may be performed by a second communication apparatus. The second communication apparatus may be a communication device, or may be a communication apparatus, for example, a chip, that can support the communication device in implementing a function required in the method. For example, the second communication apparatus is a network device, a chip that is disposed in the network device and that functions as the network device, or another component configured to implement the function of the network device. The following description process uses an example in which the second communication apparatus is the network device.

In an optional implementation, the specific configuration information includes configuration information of a specific BWP. A bandwidth of the specific BWP is less than or equal to the channel bandwidth of the first terminal device.

In an optional implementation, the method further includes receiving a random access request message from the first terminal device on a third resource, where the specific parameter is determined based on the third resource, the specific parameter is determined based on the first resource, the first random access message includes first information, and the specific parameter is determined based on the first information, or the method further includes receiving a first uplink message from the first terminal device, where the specific parameter is determined based on first information included in the first uplink message.

The first information includes type information of the first terminal device and/or type information of a service, and the service is a service supported by the first terminal device.

In an optional implementation, the method further includes receiving the random access request message from the first terminal device on the third resource, where the third resource is a part of a fourth resource, and the fourth resource is used for receiving a random access request message from the second terminal device, and sending a random access response message to the first terminal device, where the random access response message is used for scheduling the first resource.

In an optional implementation, the method further includes sending first configuration information to the first terminal device.

The first configuration information is used for configuring N random access occasions, and a bandwidth of a resource that is corresponding to each of the N random access occasions and that is used for sending a first random access message is less than or equal to the channel bandwidth of the first terminal device, the first configuration information is used for configuring M random access resources, and a bandwidth of a resource that is corresponding to each of the M random access resources and that is used for sending a first random access message is less than or equal to the channel bandwidth of the first terminal device, or the first configuration information is used for configuring K random access resources corresponding to H random access occasions, the H random access occasions belong to P random access occasions, and a bandwidth of a resource that is corresponding to each of the K random access resources and that is used for sending a first random access message is less than or equal to the channel bandwidth of the first terminal device.

N, M, K, H, and P are all integers greater than or equal to 1, and H is less than or equal to P.

In this embodiment of this disclosure, corresponding resources for sending the random access request message may be preset (for example, the resources that are preset are referred to as preset resources). In addition, it is specified that a bandwidth of a resource that is corresponding to each of the preset resources and that is used for sending the first random access message is less than or equal to the channel bandwidth of the first terminal device (the channel bandwidth of the first terminal device may include an uplink channel bandwidth and a downlink channel bandwidth, and mainly refers to the uplink channel bandwidth of the first terminal device herein). In other words, if the bandwidth of the resource that is corresponding to each of the preset resources and that is used for sending the first random access message (for example, the Msg3) is less than or equal to the channel bandwidth of the first terminal device, the first configuration information may be used for configuring the preset resources. If the corresponding preset resources are preset, after receiving the random access request message from the first terminal device, the network device determines that a random access resource for sending the random access request message belongs to the preset resources. In this case, the network device may select a resource whose bandwidth is less than or equal to the channel bandwidth of the first terminal device when allocating, to the first terminal device, the resource for sending the first random access message. In this manner, the network device can allocate, to a bandwidth-limited terminal device, a resource that meets a capability requirement of the terminal device, to improve a success rate of sending the first random access message by the terminal device and correspondingly improve a random access success rate of the terminal device.

In an optional implementation, the method further includes sending second configuration information to the first terminal device, where the second configuration information is used for configuring a second resource, the second resource is used by the second terminal device to send a first random access message, a bandwidth of the second resource is less than or equal to the first bandwidth, and the first resource is a part of the second resource.

For example, the network device may configure G resources for the first terminal device in advance. For example, the G resources belong to the second resource. A bandwidth of each of the G resources is less than or equal to the channel bandwidth of the first terminal device, and G is an integer greater than or equal to 1. The first terminal device may select one of the G resources as the first resource. In this manner, the network device may preconfigure, for the first terminal device, resources that meet a capability requirement of the first terminal device. The first terminal device only needs to select a resource from the preconfigured resources to send the first random access message (for example, a MsgA), to reduce a delay in sending the first random access message by the first terminal device. In addition, because the preconfigured resources meet the capability requirement of the first terminal device, a success rate of sending the first random access message by the first terminal device can also be improved.

For technical effects brought by the second aspect or the corresponding implementations, refer to the descriptions of the technical effects brought by the first aspect or the corresponding implementations.

According to a third aspect, a third communication method is provided. The method includes determining that an uplink channel bandwidth of a terminal device is greater than or equal to a third bandwidth, and/or that a downlink channel bandwidth of the terminal device is greater than or equal to a second bandwidth, where the third bandwidth is a bandwidth for sending a random access request message in a first cell, and the second bandwidth is a bandwidth of a control resource set 0, and determining that the terminal device can access the first cell.

The method may be performed by a third communication apparatus. The third communication apparatus may be a communication device, or may be a communication apparatus, for example, a chip, that can support the communication device in implementing a function required in the method. For example, the third communication apparatus is a terminal device, a chip that is disposed in the terminal device and that functions as the terminal device, or another component configured to implement the function of the terminal device. The following description process uses an example in which the third communication apparatus is the terminal device.

A bandwidth of the random access resource used by the terminal device to send the random access request message is the third bandwidth. In this case, provided that the uplink channel bandwidth of the terminal device is greater than or equal to the third bandwidth, the terminal device can send the random access request message. A bandwidth of a resource used by the terminal device to receive a random access response message is the bandwidth of the CORESET #0. Therefore, provided that the downlink channel bandwidth of the terminal device is greater than or equal to the second bandwidth, the terminal device can receive the random access response message. If the terminal device can send a random access request message in a cell and/or can receive a random access response message in the cell, this means that the terminal device can access the cell. Therefore, if the terminal device determines that the uplink channel bandwidth of the terminal device is greater than or equal to the third bandwidth, and/or determines that the downlink channel bandwidth of the terminal device is greater than or equal to the second bandwidth, it may be determined that the terminal device can access the first cell. The third bandwidth is generally less than a bandwidth of an initial uplink BWP, and the second bandwidth is generally less than a bandwidth of an initial downlink BWP. Therefore, such specifications in this embodiment of this disclosure improve a cell access success rate of a bandwidth-limited terminal device. In addition, the bandwidth-limited terminal device is less limited when selecting a cell. Therefore, more terminal devices can access a cell.

In an optional implementation, the method further includes receiving a system message in the first cell, and determining the third bandwidth and the second bandwidth based on the system message.

The system message may be used for configuring the second bandwidth, or configuring the third bandwidth, or configuring the second bandwidth and the third bandwidth. Alternatively, the second bandwidth and/or the third bandwidth may be configured based on another message.

In an optional implementation, the bandwidth of the control resource set 0 is less than or equal to a bandwidth of an initial BWP.

The bandwidth of the control resource set 0 may be generally less than or equal to the bandwidth of the initial BWP. Certainly, this disclosure is not limited thereto.

According to a fourth aspect, a communication apparatus is provided. For example, the communication apparatus is the first communication apparatus described above. The first communication apparatus is configured to perform the method according to any one of the first aspect or the possible implementations. Further, the first communication apparatus may include modules configured to perform the method according to any one of the first aspect or the possible implementations, for example, include a processing module and a transceiver module. For example, the transceiver module may include a sending module. Optionally, the transceiver module may further include a receiving module. The sending module and the receiving module may be different functional modules, or may be a same functional module that can implement different functions. For example, the first communication apparatus is a communication device, or is a chip or another component disposed in the communication device. For example, the communication device is a network device. The following uses an example in which the first communication apparatus is the first terminal device. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different functional modules, or may be a same functional module that can implement different functions. If the first communication apparatus is a communication device, the transceiver is implemented, for example, by using an antenna, a feeder, and a codec in the communication device. Alternatively, if the first communication apparatus is a chip disposed in the communication device, the transceiver (or the transmitter and the receiver) is, for example, a communication interface in the chip. The communication interface is connected to a radio frequency transceiver component in the communication device, to send and receive information through the radio frequency transceiver component. In a description process of the fourth aspect, the processing module, the sending module, the receiving module, and a case in which the first communication apparatus is the first terminal device are still used as examples for description.

The processing module is configured to determine a first resource.

The sending module is configured to send a first random access message on the first resource. A bandwidth of the first resource is less than or equal to a channel bandwidth of the first terminal device. The channel bandwidth of the first terminal device is less than or equal to a channel bandwidth of a second terminal device. The channel bandwidth of the second terminal device is greater than or equal to a first bandwidth. The first bandwidth is configured by the network device.

In an optional implementation, the first resource is a part of a second resource. The second resource is used by the second terminal device to send a first random access message. A bandwidth of the second resource is less than or equal to the first bandwidth.

In an optional implementation, the sending module is further configured to send a random access request message on a third resource, where the third resource is a part of a fourth resource, and the fourth resource is used by the second terminal device to send a random access request message, and the receiving module is configured to receive a random access response message, where the random access response message is used for scheduling the first resource.

In an optional implementation, the third resource is a random access resource corresponding to a first random access occasion, the first random access occasion is one of N random access occasions, a bandwidth of a resource that is corresponding to each of the N random access occasions and that is used for sending a first random access message is less than or equal to the channel bandwidth of the first terminal device, the third resource is one of M random access resources, and a bandwidth of a resource that is corresponding to each of the M random access resources and that is used for sending a first random access message is less than or equal to the channel bandwidth of the first terminal device, or the third resource is one of K random access resources, the K random access resources are corresponding to H random access occasions, the H random access occasions belong to P random access occasions, and a bandwidth of a resource that is corresponding to each of the K random access resources and that is used for sending a first random access message is less than or equal to the channel bandwidth of the first terminal device.

N, M, K, H, and P are all integers greater than or equal to 1, and H is less than or equal to P.

In an optional implementation, the receiving module is further configured to receive a first downlink message from the network device. The first downlink message includes specific configuration information of the first terminal device. The specific configuration information is used for configuring a specific parameter.

In an optional implementation, the specific configuration information includes configuration information of a specific BWP. A bandwidth of the specific BWP is less than or equal to the channel bandwidth of the first terminal device.

In an optional implementation, the third resource is used for determining the specific parameter, and the third resource is used for sending the random access request message, the first resource is used for determining the specific parameter, the first random access message includes first information, and the first information is used for determining the specific parameter, or the sending module is further configured to send a first uplink message to the network device, where the first uplink message includes first information, and the first information is used for determining the specific parameter.

The first information includes type information of the first terminal device and/or type information of a service, and the service is a service supported by the first terminal device.

In an optional implementation, the third resource is a random access resource whose subcarrier spacing is adjusted. A bandwidth of the third resource existing before the subcarrier spacing is adjusted is greater than the channel bandwidth of the first terminal device.

In an optional implementation, the channel bandwidth of the first terminal device includes the uplink channel bandwidth and the downlink channel bandwidth. The processing module is further configured to determine that the uplink channel bandwidth of the first terminal device is greater than or equal to a third bandwidth, and/or that the downlink channel bandwidth of the first terminal device is greater than or equal to a second bandwidth, where the third bandwidth is a bandwidth for sending a random access request message in a first cell covered by the network device, and the second bandwidth is a bandwidth of a control resource set 0, and determine that the first terminal device can access the first cell.

In an optional implementation, the receiving module is further configured to receive a system message in the first cell, and the processing module is further configured to determine the second bandwidth and the third bandwidth based on the system message.

In an optional implementation, the bandwidth of the control resource set 0 is less than or equal to the first bandwidth.

For technical effects brought by the fourth aspect or the optional implementations, refer to descriptions of the technical effects brought by the first aspect or the corresponding implementations.

According to a fifth aspect, a communication apparatus is provided. For example, the communication apparatus is the second communication apparatus described above. The second communication apparatus is configured to perform the method according to any one of the second aspect or the possible implementations. Further, the second communication apparatus may include modules configured to perform the method according to any one of the second aspect or the possible implementations, for example, include a transceiver module. Optionally, the second communication apparatus may further include a processing module. For example, the transceiver module may include a sending module and a receiving module. The sending module and the receiving module may be different functional modules, or may be a same functional module that can implement different functions. For example, the second communication apparatus is a communication device, or is a chip or another component disposed in the communication device. For example, the communication device is a network device. The following uses an example in which the second communication apparatus is the network device. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different functional modules, or may be a same functional module that can implement different functions. If the second communication apparatus is a communication device, the transceiver is implemented, for example, by using an antenna, a feeder, and a codec in the communication device. Alternatively, if the second communication apparatus is a chip disposed in the communication device, the transceiver (or the transmitter and the receiver) is, for example, a communication interface in the chip. The communication interface is connected to a radio frequency transceiver component in the communication device, to send and receive information through the radio frequency transceiver component. In a description process of the fifth aspect, the processing module, the sending module, the receiving module, and a case in which the second communication apparatus is the network device are still used as examples for description.

The receiving module is configured to receive a first random access message from a first terminal device on a first resource. A bandwidth of the first resource is less than or equal to a channel bandwidth of the first terminal device. The channel bandwidth of the first terminal device is less than or equal to a channel bandwidth of a second terminal device. The channel bandwidth of the second terminal device is greater than or equal to a first bandwidth. The first bandwidth is configured by the network device.

The sending module is configured to send a first downlink message to the first terminal device. The first downlink message includes specific configuration information. The specific configuration information is used for configuring a specific parameter.

In an optional implementation, the specific configuration information includes configuration information of a specific BWP. A bandwidth of the specific BWP is less than or equal to the channel bandwidth of the first terminal device.

In an optional implementation, the receiving module is further configured to receive a random access request message from the first terminal device on a third resource, where the specific parameter is determined based on the third resource, the specific parameter is determined based on the first resource, the first random access message includes first information, and the specific parameter is determined based on the first information, or the receiving module is further configured to receive a first uplink message from the first terminal device, where the specific parameter is determined based on first information included in the first uplink message.

The first information includes type information of the first terminal device and/or type information of a service, and the service is a service supported by the first terminal device.

In an optional implementation, the receiving module is further configured to receive the random access request message from the first terminal device on the third resource, where the third resource is a part of a fourth resource, and the fourth resource is used for receiving a random access request message from the second terminal device, and the sending module is further configured to send a random access response message to the first terminal device, where the random access response message is used for scheduling the first resource.

In an optional implementation, the sending module is further configured to send first configuration information to the first terminal device.

The first configuration information is used for configuring N random access occasions, and a bandwidth of a resource that is corresponding to each of the N random access occasions and that is used for sending a first random access message is less than or equal to the channel bandwidth of the first terminal device, the first configuration information is used for configuring M random access resources, and a bandwidth of a resource that is corresponding to each of the M random access resources and that is used for sending a first random access message is less than or equal to the channel bandwidth of the first terminal device, or the first configuration information is used for configuring K random access resources corresponding to H random access occasions, the H random access occasions belong to P random access occasions, and a bandwidth of a resource that is corresponding to each of the K random access resources and that is used for sending a first random access message is less than or equal to the channel bandwidth of the first terminal device.

N, M, K, H, and P are all integers greater than or equal to 1, and H is less than or equal to P.

In an optional implementation, the sending module is further configured to send second configuration information to the first terminal device. The second configuration information is used for configuring a second resource. The second resource is used by the second terminal device to send a first random access message. A bandwidth of the second resource is less than or equal to the first bandwidth. The first resource is a part of the second resource.

For technical effects brought by the fifth aspect or the optional implementations, refer to descriptions of the technical effects brought by the second aspect or the corresponding implementations.

According to a sixth aspect, a communication apparatus is provided. For example, the communication apparatus is the third communication apparatus described above. The third communication apparatus is configured to perform the method according to any one of the third aspect or the possible implementations. Further, the third communication apparatus may include modules configured to perform the method according to any one of the third aspect or the possible implementations, for example, include a processing module and a transceiver module. For example, the transceiver module may include a sending module and a receiving module. The sending module and the receiving module may be different functional modules, or may be a same functional module that can implement different functions. For example, the third communication apparatus is a communication device, or is a chip or another component disposed in the communication device. For example, the communication device is a terminal device. The following uses an example in which the third communication apparatus is the terminal device. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different functional modules, or may be a same functional module that can implement different functions. If the third communication apparatus is a communication device, the transceiver is implemented, for example, by using an antenna, a feeder, and a codec in the communication device. Alternatively, if the third communication apparatus is a chip disposed in the communication device, the transceiver (or the transmitter and the receiver) is, for example, a communication interface in the chip. The communication interface is connected to a radio frequency transceiver component in the communication device, to send and receive information through the radio frequency transceiver component. In a description process of the sixth aspect, the processing module, the transceiver module, and a case in which the third communication apparatus is the terminal device are still used as examples for description. The communication apparatus in the sixth aspect and the communication apparatus in the fourth aspect may be a same communication apparatus, or may be different communication apparatuses.

The transceiver module is configured to communicate with another apparatus.

The processing module is configured to determine that an uplink channel bandwidth of the terminal device is greater than or equal to a third bandwidth, and/or that a downlink channel bandwidth of the terminal device is greater than or equal to a second bandwidth. The third bandwidth is a bandwidth for sending a random access request message in a first cell. The second bandwidth is a bandwidth of a control resource set 0.

The processing module is further configured to determine that the terminal device can access the first cell.

In an optional implementation, the transceiver module is configured to receive a system message in the first cell, and the processing module is further configured to determine the third bandwidth and the second bandwidth based on the system message.

Alternatively, the transceiver module includes the sending module. In an optional implementation, the sending module is configured to receive a system message in the first cell, and the processing module is further configured to determine the third bandwidth and the second bandwidth based on the system message.

In an optional implementation, the bandwidth of the control resource set 0 is less than or equal to a bandwidth of an initial BWP.

For technical effects brought by the sixth aspect or the optional implementations, refer to descriptions of the technical effects brought by the third aspect or the corresponding implementations.

According to a seventh aspect, a communication apparatus is provided. For example, the communication apparatus is the first communication apparatus described above. The communication apparatus includes a processor and a communication interface. The communication interface may be configured to communicate with another apparatus or device. Optionally, the communication apparatus may further include a memory configured to store computer instructions. The processor and the memory are coupled to each other, to implement the method according to any one of the first aspect or the possible implementations. Alternatively, the first communication apparatus may not include a memory, and the memory may be located outside the first communication apparatus. The processor, the memory, and the communication interface are coupled to each other, to implement the method according to any one of the first aspect or the possible implementations. For example, when the processor executes the computer instructions stored in the memory, the first communication apparatus is enabled to perform the method according to any one of the first aspect or the possible implementations. For example, the first communication apparatus is a communication device, or is a chip or another component disposed in the communication device. For example, the communication device is a first terminal device.

If the first communication apparatus is a communication device, the communication interface is implemented, for example, by using a transceiver (or a transmitter and a receiver) in the communication device, and the transceiver is implemented, for example, by using an antenna, a feeder, and a codec in the communication device. Alternatively, if the first communication apparatus is a chip disposed in the communication device, the communication interface is, for example, an input/output interface such as an input/output pin of the chip. The communication interface is connected to a radio frequency transceiver component in the communication device, to send and receive information through the radio frequency transceiver component.

According to an eighth aspect, a communication apparatus is provided. For example, the communication apparatus is the second communication apparatus described above. The communication apparatus includes a processor and a communication interface. The communication interface may be configured to communicate with another apparatus or device. Optionally, the communication apparatus may further include a memory configured to store computer instructions. The processor and the memory are coupled to each other, to implement the method according to any one of the second aspect or the possible implementations. Alternatively, the second communication apparatus may not include a memory, and the memory may be located outside the second communication apparatus. The processor, the memory, and the communication interface are coupled to each other, to implement the method according to any one of the second aspect or the possible implementations. For example, when the processor executes the computer instructions stored in the memory, the second communication apparatus is enabled to perform the method according to any one of the second aspect or the possible implementations. For example, the second communication apparatus is a communication device, or is a chip or another component disposed in the communication device. For example, the communication device is a network device.

If the second communication apparatus is a communication device, the communication interface is implemented, for example, by using a transceiver (or a transmitter and a receiver) in the communication device, and the transceiver is implemented, for example, by using an antenna, a feeder, and a codec in the communication device. Alternatively, if the second communication apparatus is a chip disposed in the communication device, the communication interface is, for example, an input/output interface such as an input/output pin of the chip. The communication interface is connected to a radio frequency transceiver component in the communication device, to send and receive information through the radio frequency transceiver component.

According to a ninth aspect, a communication apparatus is provided. For example, the communication apparatus is the third communication apparatus described above. The communication apparatus includes a processor and a communication interface. The communication interface may be configured to communicate with another apparatus or device. Optionally, the communication apparatus may further include a memory configured to store computer instructions. The processor and the memory are coupled to each other, to implement the method according to any one of the third aspect or the possible implementations. Alternatively, the third communication apparatus may not include a memory, and the memory may be located outside the third communication apparatus. The processor, the memory, and the communication interface are coupled to each other, to implement the method according to any one of the third aspect or the possible implementations. For example, when the processor executes the computer instructions stored in the memory, the third communication apparatus is enabled to perform the method according to any one of the third aspect or the possible implementations. For example, the third communication apparatus is a communication device, or is a chip or another component disposed in the communication device. For example, the communication device is a terminal device.

If the third communication apparatus is a communication device, the communication interface is implemented, for example, by using a transceiver (or a transmitter and a receiver) in the communication device, and the transceiver is implemented, for example, by using an antenna, a feeder, and a codec in the communication device. Alternatively, if the third communication apparatus is a chip disposed in the communication device, the communication interface is, for example, an input/output interface such as an input/output pin of the chip. The communication interface is connected to a radio frequency transceiver component in the communication device, to send and receive information through the radio frequency transceiver component.

The communication apparatus in the ninth aspect and the communication apparatus in the seventh aspect may be a same communication apparatus, or may be different communication apparatuses.

According to a tenth aspect, a chip is provided. The chip includes a processor and a communication interface. The processor is coupled to the communication interface, and is configured to implement the method according to any one of the first aspect or the optional implementations.

Optionally, the chip may further include a memory. For example, the processor may read and execute a software program stored in the memory, to implement the method according to any one of the first aspect or the optional implementations. Alternatively, the memory may not be included in the chip, but is located outside the chip. This is equivalent to that the processor may read and execute a software program stored in an external memory, to implement the method according to any one of the first aspect or the optional implementations.

According to an eleventh aspect, a chip is provided. The chip includes a processor and a communication interface. The processor is coupled to the communication interface, and is configured to implement the method according to any one of the second aspect or the optional implementations.

Optionally, the chip may further include a memory. For example, the processor may read and execute a software program stored in the memory, to implement the method according to any one of the second aspect or the optional implementations. Alternatively, the memory may not be included in the chip, but is located outside the chip. This is equivalent to that the processor may read and execute a software program stored in an external memory, to implement the method according to any one of the second aspect or the optional implementations.

According to a twelfth aspect, a chip is provided. The chip includes a processor and a communication interface. The processor is coupled to the communication interface, and is configured to implement the method according to any one of the third aspect or the optional implementations.

Optionally, the chip may further include a memory. For example, the processor may read and execute a software program stored in the memory, to implement the method according to any one of the third aspect or the optional implementations. Alternatively, the memory may not be included in the chip, but is located outside the chip. This is equivalent to that the processor may read and execute a software program stored in an external memory, to implement the method according to any one of the third aspect or the optional implementations.

The communication apparatus in the twelfth aspect and the communication apparatus in the tenth aspect may be a same communication apparatus, or may be different communication apparatuses.

According to a thirteenth aspect, a first communication system is provided. The communication system includes the communication apparatus according to the fourth aspect, the communication apparatus according to the seventh aspect, or the communication apparatus according to the tenth aspect, and includes the communication apparatus according to the fifth aspect, the communication apparatus according to the eighth aspect, or the communication apparatus according to the eleventh aspect.

According to a fourteenth aspect, a first communication system is provided. The communication system includes the communication apparatus according to the sixth aspect, the communication apparatus according to the ninth aspect, or the communication apparatus according to the twelfth aspect.

According to a fifteenth aspect, a computer-readable storage medium is provided. The computer-readable storage medium is configured to store a computer program. When the computer program is run on a computer, the computer is enabled to perform the method according to any one of the first aspect or the possible implementations.

According to a sixteenth aspect, a computer-readable storage medium is provided. The computer-readable storage medium is configured to store a computer program. When the computer program is run on a computer, the computer is enabled to perform the method according to any one of the second aspect or the possible implementations.

According to a seventeenth aspect, a computer-readable storage medium is provided. The computer-readable storage medium is configured to store a computer program. When the computer program is run on a computer, the computer is enabled to perform the method according to any one of the third aspect or the possible implementations.

According to an eighteenth aspect, a computer program product including instructions is provided. The computer program product is configured to store a computer program. When the computer program is run on a computer, the computer is enabled to perform the method according to any one of the first aspect or the possible implementations.

According to a nineteenth aspect, a computer program product including instructions is provided. The computer program product is configured to store a computer program. When the computer program is run on a computer, the computer is enabled to perform the method according to any one of the second aspect or the possible implementations.

According to a twentieth aspect, a computer program product including instructions is provided. The computer program product is configured to store a computer program. When the computer program is run on a computer, the computer is enabled to perform the method according to any one of the third aspect or the possible implementations.

In embodiments of this disclosure, when sending the first random access message, the first terminal device may determine a resource whose bandwidth is less than or equal to the channel bandwidth of the first terminal device as the first resource. For example, the first random access message is a Msg3 or a MsgA. According to the technical solutions provided in embodiments of this disclosure, even a terminal device with a limited capability can send the Msg3 or the MsgA, to improve a random access success rate of the terminal device.

DESCRIPTION OF EMBODIMENTS

Figure 1:
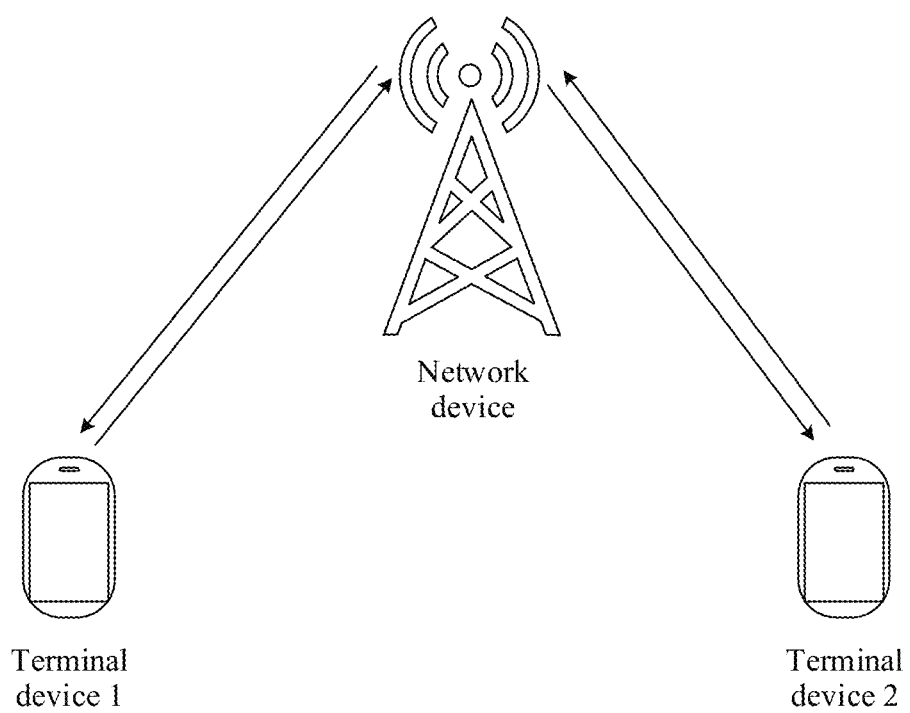
FIG. 1 is a schematic diagram of an application scenario according to an embodiment of this disclosure.

To make objectives, technical solutions, and advantages of embodiments of this disclosure clearer, the following further describes embodiments of this disclosure in detail with reference to the accompanying drawings.

The following describes some terms in embodiments of this disclosure, to facilitate understanding of a person skilled in the art.

(1) Terminal device: The terminal device includes a device that provides a voice and/or data connectivity for a user. Further, the terminal device includes a device that provides a voice for the user, includes a device that provides data connectivity for the user, or includes a device that provides a voice and data connectivity for the user. For example, the terminal device may include a handheld device having a wireless connection function or a processing device connected to a wireless modem. The terminal device may communicate with a core network through a radio access network (RAN), and exchange a voice or data with the RAN, or exchange the voice and the data with the RAN. The terminal device may include user equipment (UE), a wireless terminal device, a mobile terminal device, a device-to-device (D2D) communication terminal device, a vehicle to everything (V2X) terminal device, a machine-to-machine (M2M)/machine type communication (MTC) terminal device, an Internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or a cellular phone), a computer having a mobile terminal device, or a portable, pocket-sized, handheld, or computer built-in mobile apparatus. For example, the terminal device may be a device such as a personal communication service (PCS) phone, a cordless telephone set, a Session Initiation Protocol (SIP) phone, a wireless local loop (WLL) station, or a personal digital assistant (PDA). The terminal device may alternatively include a limited device, for example, a device with low power consumption, a device with a limited storage capability, or a device with a limited computing capability. For example, the terminal device includes an information sensing device such as a barcode, radio frequency identification (RFID), a sensor, a Global Positioning System (GPS), or a laser scanner.

By way of example, and not limitation, in embodiments of this disclosure, the terminal device may alternatively be a wearable device. The wearable device may be a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn on a body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as vehicle-mounted terminal devices. For example, the vehicle-mounted terminal device is also referred to as an on-board unit (OBU).

In embodiments of this disclosure, the terminal device may further include a relay. Alternatively, it may be understood that any device that can perform data communication with a base station may be considered as a terminal device.

In embodiments of this disclosure, an apparatus functioning as a terminal device may be a terminal device, or may be an apparatus, for example, a chip system, that can support the terminal device in implementing the function. The apparatus may be installed in the terminal device. In this embodiment of this disclosure, the chip system may include a chip, or may include a chip and another discrete component. In the technical solutions provided in embodiments of this disclosure, an example in which an apparatus functioning as a terminal is a terminal device is used for describing the technical solutions provided in embodiments of this disclosure.

(2) Network device: A network device includes, for example, an access network (AN) device such as a base station (for example, an access point), and may be a device that is in an access network and that communicates with a wireless terminal device over an air interface through one or more cells. Alternatively, the network device is, for example, a road side unit (RSU) in a V2X technology. The base station may be configured to mutually convert a received over-the-air frame and an Internet Protocol (IP) packet, and serve as a router between the terminal device and a remaining part of the access network, where the remaining part of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (eNB or e-NodeB) in a Long-Term Evolution (LTE) system or a LTE-advanced (LTE-A) system, may include a next-generation node B (gNB) in a $5^{th}$ generation (5G) mobile communication technology NR system (or an NR system), or may include a centralized unit (CU) and a distributed unit (DU) in a cloud RAN system. This is not limited in this embodiment of this disclosure.

The network device may further include a core network device, and the core network device includes, for example, an access and mobility management function (AMF). Embodiments of this disclosure do not relate to a core network. Therefore, unless otherwise specified in the following, the network device refers to an access network device.

In embodiments of this disclosure, an apparatus functioning as a network device may be a network device, or may be an apparatus, for example, a chip system, that can support the network device in implementing the function. The apparatus may be installed in the network device. In the technical solutions provided in embodiments of this disclosure, an example in which an apparatus functioning as a network device is a network device is used for describing the technical solutions provided in embodiments of this disclosure.

(3) Terms "system" and "network" may be used interchangeably in embodiments of this disclosure. "At least one" means one or more, and "a plurality of" means two or more. The term "and/or" describes an association relationship for describing associated objects and represents that three relationships may exist. For example, A and/or B may represent the following three cases: only A exists, both A and B exist, and only B exists. A and B each may be singular or plural. The character "/" generally represents an "or" relationship between associated objects. At least one of the following items (pieces) or a similar expression thereof refers to any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural.

In addition, unless otherwise stated, in embodiments of this disclosure, ordinal numbers such as "first" and "second" are intended to distinguish between a plurality of objects, but are not intended to limit sizes, content, orders, time sequences, priorities, importance, or the like of the plurality of objects. For example, a first resource and a second resource are merely used for distinguishing between different resources, but do not indicate different sizes, priorities, importance degrees, or the like of the two resources.

The foregoing describes concepts of some terms in embodiments of this disclosure. The following describes technical features in embodiments of this disclosure.

A terminal device may implement uplink synchronization with a network device in a random access procedure. The random access procedure includes a contention-based random access procedure and a non-contention-based random access procedure. The contention-based random access procedure is completed in four steps: 1. A terminal device sends a random access request to a network device. The random access request may also be referred to as a first message (Msg1), and includes a random access preamble. 2. The network device sends an RAR message to the terminal device. The RAR message may also be referred to as a second message (Msg2). 3. After receiving the RAR message, the terminal device transmits a message based on scheduling information carried in the RAR message. The message is referred to as a Msg3. 4. The network device sends contention resolution information to the terminal device. A message carrying the contention resolution information is referred to as a fourth message (Msg4). The RAR message may include a random access preamble (RAP) identifier (ID). When the RAP ID is matched with (or the same as) a preamble ID selected by the terminal device, the terminal device considers that the RAR message is an RAR message in response to the preamble sent by the terminal device.

The contention-based 4-step random access procedure described above requires a large quantity of interaction procedures and a long delay, and therefore cannot be well applied to a scenario with a high requirement for a delay. Therefore, the contention-based 2-step random access procedure is introduced: 1. The terminal device sends a MsgA to the network device. The MsgA may also be referred to as a first message. The MsgA includes a preamble and possible uplink data (similar to the Msg1 and the Msg3 in the 4-step random access procedure). The uplink data is carried on a data channel (for example, a physical uplink shared channel (PUSCH)). 2. The terminal device receives a message B (MsgB) from the network device. The MsgB may also be referred to as a second message (similar to the Msg2 and the Msg4 in the 4-step random access procedure). Therefore, contention resolution is completed, uplink synchronization is performed, and a cell-radio network temporary identifier (C-RNTI) is obtained. It is clear that in the 2-step random access procedure, because there are few interaction steps, a network access delay may be reduced, to help meet the scenario with a high requirement for a delay.

To complete random access, there is a specific requirement on a bandwidth of the terminal device. However, in addition to some terminal devices with proper functions, there are some terminal devices with a limited capability, for example, an NR light terminal device (REDCAP), an enhanced machine type communication (eMTC) terminal device, or a narrow band IoT (NB-IoT) terminal device. Such a terminal device may have a limited bandwidth. For example, the NR light terminal device may support a maximum bandwidth of 5 Mbps, 10 Mbps, or 20 Mbps. If such a terminal device is limited based on a bandwidth requirement for an ordinary terminal device, random access may fail.

Therefore, in eMTC or NB-IoT, a specific RACH resource is reserved for the eMTC terminal device and the NB-IoT terminal device. The eMTC terminal device or the NB-IoT terminal device may select the reserved RACH resource to send a Msg1 to the network device. The network device may determine, based on the RACH resource used by the terminal device initiating random access, whether the terminal device is the eMTC terminal device or the NB-IoT terminal device. If the network device determines that the terminal device is the eMTC terminal device or the NB-IoT terminal device, the network device schedules, starting from an RAR message, the terminal device to use a narrow band control channel or a narrow band data channel.

A problem of this method is that the specific RACH resource needs to be reserved, and the terminal device does not share a RACH resource with the ordinary terminal device. This may cause a waste of resources to some extent. For example, in some cases, if a quantity of eMTC terminal devices or NB-IoT terminal devices that initiate random access is small, reserved RACH resources are idle, but RACH resources for ordinary terminal devices may be insufficient.

The NR light terminal device can properly receive a synchronization signal and a physical broadcast channel block (SSB). Because the SSB includes a master information block (MIB), the NR light terminal device can properly receive the MIB. The MIB includes configuration information of a control channel for a SIB1 and configuration information of a CORESET #0. The NR light terminal device monitors, based on the configuration information of the CORESET #0, the control channel for scheduling the SIB1, to receive the SIB1. The SIB1 includes downlink configuration information and uplink configuration information. The uplink configuration information includes configuration information of a RACH. A bandwidth of the RACH resource may be determined according to Table 1.

TABLE 1

| $L_{RA}$ | $\Delta f^{RA}$ | $\Delta f$ | $N^{RA}_{RB}$ | $\bar{k}$ |
|---|---|---|---|---|
| 839 | 1.25 | 15 | 6 | 7 |
| 839 | 1.25 | 30 | 3 | 1 |
| 839 | 1.25 | 60 | 2 | 133 |
| 839 | 5 | 15 | 24 | 12 |
| 839 | 5 | 30 | 12 | 10 |
| 839 | 5 | 60 | 6 | 7 |
| 139 | 15 | 15 | 12 | 2 |
| 139 | 15 | 30 | 6 | 2 |
| 139 | 15 | 60 | 3 | 2 |
| 139 | 30 | 15 | 24 | 2 |
| 139 | 30 | 30 | 12 | 2 |
| 139 | 30 | 60 | 6 | 2 |
| 139 | 60 | 60 | 12 | 2 |
| 139 | 60 | 120 | 6 | 2 |
| 139 | 120 | 60 | 24 | 2 |
| 139 | 120 | 120 | 12 | 2 |

In Table 1, $L_{RA}$ is a sequence length of a preamble. $\Delta f^{RA}$ is a subcarrier spacing of a RACH resource. $\Delta f$ is a subcarrier spacing of a PUSCH. $N_{RB}^{RA}$ is a quantity of resource blocks (RBs) occupied by the RACH resource. $\bar{k}$ is an adjustment value.

In a row in Table 1, if a product of the first column and the second column is less than or equal to the bandwidth of the terminal device, the terminal device can support a configuration in this row. For example, in the second row of Table 1, a product of the first column and the second column is 839×1.25=1048.75 in a unit of K, and is converted into 1.02 M. If the bandwidth of the NR light terminal device is 5 MVbps, 1.02 M is less than 5 MVbps, so that a configuration shown in the second row in Table 1 can be supported by the NR light terminal device. It can be learned based on this calculation manner that, if the bandwidth of the NR light terminal device is 5 MVbps, the NR light terminal device can support configurations from the second row to the thirteenth row in Table 1. If the bandwidth of the NR light terminal device is 10 MVbps, the NR light terminal device can support configurations from the second row to the fifteenth row in Table 1. If the bandwidth of the NR light terminal device is 20 MVbps, the NR light terminal device can support configurations from the second row to the seventeenth row in Table 1, namely, all the configurations in Table 1.

For configurations of processes such as sending and receiving of each message and a corresponding control channel, receiving of a system message, or receiving of a paging message in a random access procedure, a current protocol specifies that when the system message is received, a configuration corresponding to the CORESET #0 is used for the control channel, and a bandwidth of the data channel carrying the SIB1 is also limited within a bandwidth range of the CORESET #0.

In the random access procedure, a bandwidth of a data channel for a downlink RAR message and a contention resolution message Msg4 is also limited within the bandwidth range of the CORESET #0. Therefore, for the NR light UE, provided that the NR light terminal device can monitor the CORESET #0, the NR light terminal device can receive the RAR and the Msg4.

However, it can be learned from the foregoing description of the random access procedure that, in the random access procedure, the terminal device further needs to send a Msg3 to the network device. Based on current specifications, a bandwidth of a resource for sending the Msg3 may reach a bandwidth of an initial uplink BWP. The bandwidth of the initial uplink BWP is configured based on the system message, and is generally configured to be large. For the NR light terminal device, an uplink bandwidth may be less than the bandwidth of the initial uplink BWP. If a resource is allocated to the Msg3 within the entire bandwidth of the initial uplink BWP, for example, up to the bandwidth of the initial uplink BWP, a bandwidth of the resource for sending the Msg3 may be greater than the bandwidth of the NR light terminal device. In this case, the NR light terminal device cannot send the Msg3 to the network device. Consequently, the NR light terminal device cannot complete random access.

In view of this, the technical solutions in embodiments of this disclosure are provided. In this embodiment of this disclosure, when sending a first random access message, a first terminal device may determine a resource whose bandwidth is less than or equal to a channel bandwidth of the first terminal device as a first resource. For example, the first random access message is a Msg3 or a MsgA. If the bandwidth of the first resource is supported by the first terminal device, the first terminal device can properly send the Msg3 or the MsgA. According to the technical solution provided in this embodiment of this disclosure, even a terminal device with a limited capability can send the Msg3 or the MsgA. Therefore, the technical solution provided in this embodiment of this disclosure can improve a random access success rate of the terminal device. In addition, even a terminal device with an unlimited capability or the ordinary terminal device can select the first resource to send the first random access message. In other words, these resources are not reserved only for a bandwidth-limited terminal device, and a bandwidth-unlimited terminal device can also use these resources. This manner can improve resource usage and reduce a waste of resources.

The technical solutions provided in embodiments of this disclosure may be applied to a $4^{th}$ generation (4G) mobile communication technology system, for example, an LTE system, or may be applied to a 5G system, for example, an NR system, or may be applied to a next-generation mobile communication system or another similar communication system. This is not limited.

FIG. 1 shows an application scenario according to an embodiment of this disclosure. FIG. 1 shows a network device, a terminal device 1, and a terminal device 2. The network device and the terminal device 1 can communicate with each other. For example, the terminal device 1 may initiate random access to the network device. The network device and the terminal device 2 can also communicate with each other. For example, the terminal device 2 may initiate random access to the network device. The terminal device 1 may be a bandwidth-limited terminal device, for example, an NR light terminal device. The terminal device 2 may be a bandwidth-unlimited terminal device, or may be an ordinary terminal device.

For example, the network device operates in an Evolved Universal Mobile Telecommunications System Terrestrial Radio Access (E-UTRA) system, or operates in an NR system, or operates in a next-generation communication system or another communication system.

For example, the network device in FIG. 1 is a base station. The network device corresponds to different devices in different systems. For example, the network device may correspond to an eNB in a 4G system, and correspond to a 5G access network device such as a gNB in a 5G system. Certainly, the technical solutions provided in embodiments of this disclosure may also be applied to a future mobile communication system. Therefore, the network device in FIG. 1 may also correspond to a network device in the future mobile communication system. In FIG. 1, for example, the network device is a base station. Actually, based on the foregoing description, the network device may alternatively be a device such as an RSU. In addition, for example, both the terminal device 1 and the terminal device 2 in FIG. 1 are mobile phones. Actually, it can be learned from the foregoing description of the terminal device that the terminal device in this embodiment of this disclosure is not limited to the mobile phone.

With reference to the accompanying drawings, the following describes methods provided in embodiments of this disclosure.

Figure 2:
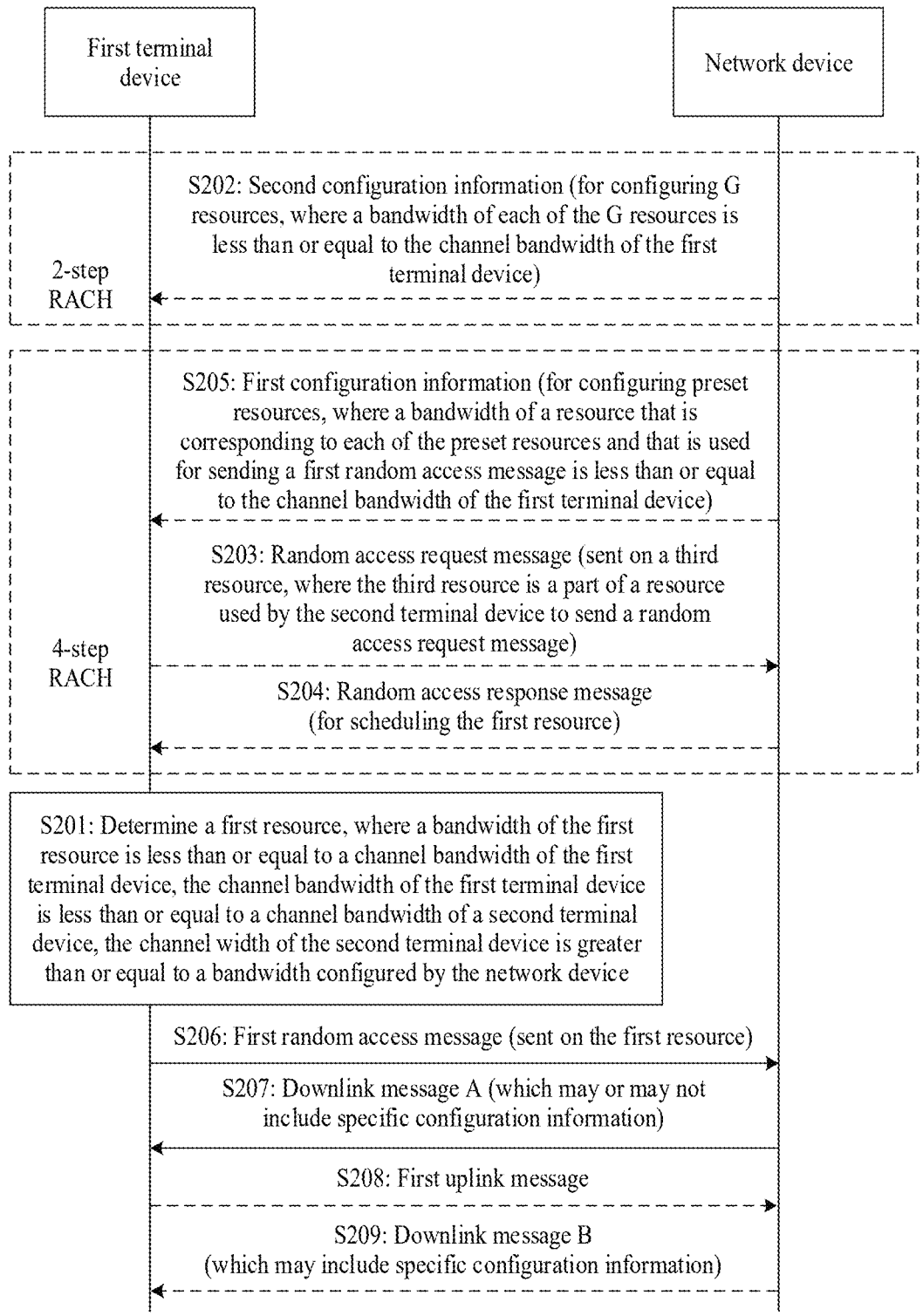
FIG. 2 is a flowchart of a first communication method according to an embodiment of this disclosure.

An embodiment of this disclosure provides a first communication method. FIG. 2 is a flowchart of the method. The following description process uses an example in which the method is applied to a network architecture shown in FIG. 1.

For ease of description, the following uses an example in which the method is performed by a network device and a first terminal device. Because this embodiment is applied to the network architecture shown in FIG. 1, the network device described below may be the network device in the network architecture shown in FIG. 1, the first terminal device described below may be the terminal device 1 in the network architecture shown in FIG. 1, and a second terminal device described below may be the terminal device 2 in the network architecture shown in FIG. 1.

S201: The first terminal device determines a first resource. A bandwidth of the first resource is less than or equal to a channel bandwidth of the first terminal device.

For example, the first terminal device is a bandwidth-limited terminal device. In this embodiment of this disclosure, the limited bandwidth of the first terminal device means that the channel bandwidth of the first terminal device is less than or equal to a channel bandwidth of the second terminal device. The second terminal device is an ordinary terminal device, for example, an NR terminal device. The channel bandwidth of the second terminal device may be greater than or equal to a first bandwidth, and the channel bandwidth of the second terminal device may also be less than or equal to a carrier bandwidth. The carrier bandwidth may be a bandwidth of a carrier for the first terminal device and the second terminal device. Alternatively, in this embodiment of this disclosure, the limited bandwidth of the first terminal device means that the channel bandwidth of the first terminal device is less than the first bandwidth. The first bandwidth may be configured by the network device. For example, the first bandwidth is a bandwidth of an initial BWP configured by the network device. Certainly, in practice, because the first bandwidth is configured by the network device, the first bandwidth configured by the network device may be greater than or equal to the channel bandwidth of the first terminal device, or may be less than the channel bandwidth of the first terminal device. For example, the first terminal device is an NR light terminal device. Certainly, the first terminal device may alternatively be another type of bandwidth-limited terminal device, for example, an eMTC terminal device or an NB-IoT terminal device.

The first resource is used for sending a first random access message in a random access procedure. It should be noted that the first random access message does not refer to a Msg1. If the random access procedure is a 4-step RACH procedure, the first random access message may be a Msg3, or if the random access procedure is a 2-step RACH procedure, the first random access message may be a MsgA.

It can be learned from the foregoing analysis that, if the first terminal device can camp on a cell, a bandwidth risk point of the first terminal device during random access is that a bandwidth of a resource for sending the Msg3 is based on the bandwidth of the initial BWP, and the bandwidth of the resource for sending the Msg3 may reach the bandwidth of the initial BWP. The initial BWP may include an initial uplink BWP and an initial downlink BWP. Both a bandwidth of the initial uplink BWP and a bandwidth of the initial downlink BWP are configured by the network device based on a SIB1. The resource for sending the Msg3 is an uplink resource. Therefore, that the bandwidth of the resource for sending the Msg3 reaches the bandwidth of the initial BWP may be that the bandwidth of the resource for sending the Msg3 is allocated within an entire bandwidth range of the initial uplink BWP, for example, fully occupies the entire initial uplink BWP. If the Msg3 is initially transmitted, the resource for sending the Msg3 may be allocated by the network device based on an RAR message, or if the Msg3 is retransmitted, the resource for sending the Msg3 may be allocated by the network device through a physical downlink control channel (PDCCH) scrambled by using a temporary C-RNTI. However, if the first terminal device is a bandwidth-limited terminal device, such a bandwidth may be required to be greater than a capability of the first terminal device, causing a random access failure.

Therefore, in this embodiment of this disclosure, a bandwidth of the first resource that is used for sending the first random access message and that is determined by the first terminal device is less than or equal to the channel bandwidth of the first terminal device. The channel bandwidth of the first terminal device may include an uplink channel bandwidth and a downlink channel bandwidth. That the bandwidth of the first resource is less than or equal to the channel bandwidth of the first terminal device may be that the bandwidth of the first resource is less than or equal to the uplink channel bandwidth of the first terminal device. In this way, the bandwidth of the first resource can be supported by the first terminal device, to improve a success rate of sending the first random access message by the first terminal device.

If the random access procedure is a 2-step RACH procedure and the first random access message is a MsgA, the first resource may be configured by the network device. For example, before S201, S202 may be further performed. The network device sends second configuration information to the first terminal device, and the first terminal device receives the second configuration information from the network device. The second configuration information may be used for configuring G resources. A bandwidth of each of the G resources is less than or equal to the channel bandwidth of the first terminal device, and G is an integer greater than or equal to 1. S202 is an optional step, and is not necessarily performed. Therefore, S202 is represented by a dashed line in FIG. 2. The first terminal device may select one of the G resources as the first resource. In this manner, the network device may preconfigure, for the first terminal device, resources that meet a capability requirement of the first terminal device. The first terminal device only needs to select a resource from the preconfigured resources to send the MsgA, to reduce a delay in sending the MsgA by the first terminal device. In addition, because the preconfigured resources meet the capability requirement of the first terminal device, a success rate of sending the MsgA by the first terminal device can also be improved.

The G resources may be a part of a second resource. In this case, the first resource is a part of the second resource. The second resource is used by the second terminal device to send a MsgA. For example, the first terminal device is a bandwidth-limited terminal device, and the second terminal device is a bandwidth-unlimited terminal device. In other words, channel bandwidth of the first terminal device is less than or equal to the channel bandwidth of the second terminal device. In addition, the channel bandwidth of the second terminal device is greater than or equal to the first bandwidth. Because the second terminal device may send the MsgA on the second resource, the bandwidth of the second resource is less than or equal to the channel bandwidth of the second terminal device.

The second resource may include one or more resources. That the bandwidth of the second resource is less than or equal to the channel bandwidth of the second terminal device is that a bandwidth of each of the one or more resources is less than or equal to the channel bandwidth of the second terminal device. For example, there are five resources that can be used by a terminal device to send a MsgA, and the five resources belong to the second resource. In the five resources, if a bandwidth of each of two resources is less than or equal to the channel bandwidth of the first terminal device, the G resources configured by the network device are the two resources. The first terminal device may select one of the two resources as the first resource. The second terminal device may select the second resource to send the MsgA, or may select the first resource to send the MsgA. For example, the second terminal device may select one of the five resources to send the MsgA, or may select one of the two resources to send the MsgA.

Alternatively, if the random access procedure is a 4-step RACH procedure and the first random access message is a Msg3, the first resource may be scheduled by the network device. If the random access procedure is the 4-step RACH procedure, before S201, S203 may be further performed. The first terminal device sends a random access request message to the network device on a third resource, and the network device receives the random access request message from the first terminal device on the third resource. A bandwidth of the third resource may be less than or equal to the channel bandwidth of the first terminal device (which may be the uplink channel bandwidth of the first terminal device herein). In addition, the bandwidth of the third resource may be less than or equal to the bandwidth of the initial BWP (which may be the bandwidth of the initial uplink BWP herein). For example, the random access request message is a Msg1, namely, a preamble. In addition, if the Msg3 is initially transmitted, after S203 and before S201, S204 may be further performed. The network device sends a random access response message to the first terminal device, and the first terminal device receives the random access response message from the network device. The random access response message may be used for scheduling the first resource. In this way, the first terminal device may determine the first resource after receiving the random access response message. For example, the random access response message is a Msg2, namely, an RAR message. Alternatively, if the Msg3 is retransmitted, S204 may include that the network device sends, to the first terminal device, the PDCCH scrambled by using the Temporary C-RNTI (TC-RNTI), and the first terminal device receives the PDCCH from the network device. The PDCCH may be used for scheduling the first resource. In this way, the first terminal device may determine the first resource after receiving the PDCCH. S203 and S204 are optional steps, and are not necessarily performed. Therefore, S203 and S204 are represented by dashed lines in FIG. 2. In addition, for example, the network device sends the random access response message in S204 in FIG. 2.

In this implementation, the third resource for sending the random access request message may be configured by the network device. For example, before S203, S205 may be further performed. The network device sends first configuration information to the first terminal device, and the first terminal device receives the first configuration information from the network device. For ease of description, resources for sending the Msg3 are collectively referred to as scheduling transmission resources in this specification. In this embodiment of this disclosure, corresponding resources for sending the random access request message may be preset (for example, the resources that are preset are referred to as preset resources). In addition, it is specified that a bandwidth of a scheduling transmission resource corresponding to each of the preset resources is less than or equal to the channel bandwidth of the first terminal device (the channel bandwidth of the first terminal device may include the uplink channel bandwidth and the downlink channel bandwidth, and mainly refers to the uplink channel bandwidth of the first terminal device herein). In other words, if the bandwidth of the resource that is corresponding to each of the preset resources and that is used for sending the first random access message (for example, the Msg3) is less than or equal to the channel bandwidth of the first terminal device, the first configuration information may be used for configuring the preset resources. The first terminal device may be the bandwidth-limited terminal device, for example, the NR light terminal device. Therefore, the preset resources may be resources that can be supported by the bandwidth-limited first terminal device. For specific random access resources that can be supported by the bandwidth-limited terminal device, refer to Table 1. If the corresponding preset resources are preset, after receiving the random access request message from the first terminal device, the network device determines that a random access resource for sending the random access request message belongs to the preset resources. In this case, the network device may select a resource whose bandwidth is less than or equal to the channel bandwidth of the first terminal device when allocating a scheduling transmission resource to the first terminal device. If the Msg3 is initially transmitted, the network device may allocate, to the first terminal device based on the RAR message, the resource for sending the Msg3, or if the Msg3 is retransmitted, the network device may allocate, to the first terminal device through the PDCCH scrambled by using the TC-RNTI, the resource for sending the Msg3.

In addition, the third resource may be a part of a fourth resource. The fourth resource may be used by the second terminal device to send a Msg1. A bandwidth of the fourth resource may be less than or equal to the channel bandwidth of the second terminal device (which may be an uplink channel bandwidth of the second terminal device herein). In addition, the bandwidth of the fourth resource may be less than or equal to the bandwidth of the initial BWP (which may be the bandwidth of the initial uplink BWP herein). For example, there are seven resources that can be used by a terminal device to send a Msg1, and the seven resources belong to the fourth resource. In the seven resources, three resources may be used by the first terminal device to send the Msg1. For example, if a bandwidth of each of the three resources is less than or equal to the channel bandwidth of the first terminal device (which may be the uplink channel bandwidth of the first terminal device herein), the preset resources configured by the network device include the three resources. The first terminal device may select one of the three resources as the third resource. The second terminal device may select the fourth resource to send the Msg1, or may select the third resource to send the Msg1. For example, the second terminal device may select one of the seven resources to send the Msg1, or may select one of the three resources to send the Msg1.

In an implementation of the preset resources, the preset resources include N random access occasions (ROs). The first configuration information may be used for configuring the N random access occasions. A bandwidth of a resource that is corresponding to each of the N random access occasions and that is used for sending a first random access message is less than or equal to the channel bandwidth of the first terminal device. The random access occasions may include time-frequency resources for random access. In this case, the third resource may be a random access resource corresponding to a first random access occasion of the N random access occasions. In other words, the first terminal device may select the random access resource corresponding to the first random access occasion of the N random access occasions as the third resource. The first random access occasion may be any one of the N random access occasions. If the first terminal device selects a random access resource corresponding to one of the N random access occasions to send the random access request, when the network device receives the random access request message from the first terminal device on the random access resource and allocates a scheduling transmission resource to the first terminal device, the bandwidth of the allocated scheduling transmission resource may be less than or equal to the channel bandwidth of the first terminal device. In addition, such a bandwidth can be supported by the first terminal device, to improve a success rate of sending the Msg3. Alternatively, if a resource used by the first terminal device to send the random access request message is not a random access resource corresponding to any one of the N random access occasions, when the network device receives the random access request message from the first terminal device and allocates a scheduling transmission resource to the first terminal device, the bandwidth of the allocated scheduling transmission resource may be less than or equal to the channel bandwidth of the first terminal device, or may be greater than the channel bandwidth of the first terminal device. If the random access occasions are corresponding to the scheduling transmission resources, a quantity of the configured random access resources is large, and an amount of information for indicating the random access resources is small. The random access resource described in this specification is a resource for sending a random access request message. One random access occasion may be corresponding to one or more random access resources. This implementation may also be used for MsgA resource selection in the 2-step RACH procedure. For example, a bandwidth of a resource that is corresponding to each of the N random access occasions and that is used for sending uplink data (carried on a PUSCH) in the MsgA is less than or equal to the channel bandwidth of the first terminal device.

Alternatively, in another implementation of the preset resources, the preset resources include M random access resources. The first configuration information may be used for configuring the M random access resources. A bandwidth of a resource that is corresponding to each of the M random access resources and that is used for sending a first random access message is less than or equal to the channel bandwidth of the first terminal device. The random access resource may be a random access preamble, for example, a preamble. In this case, the third resource may be any one of the M random access resources. In other words, the first terminal device may select one of the M random access resources as the third resource. If the first terminal device selects one of the M random access resources to send the random access request, when the network device receives the random access request message from the first terminal device on the random access resource and allocates a scheduling transmission resource to the first terminal device, the bandwidth of the allocated scheduling transmission resource may be less than or equal to the channel bandwidth of the first terminal device. In addition, such a bandwidth can be supported by the first terminal device, to improve a success rate of sending the Msg3. Alternatively, if a resource used by the first terminal device to send the random access request message is not any one of the M random access resources, when the network device receives the random access request message from the first terminal device and allocates a scheduling transmission resource to the first terminal device, the bandwidth of the allocated scheduling transmission resource may be less than or equal to the channel bandwidth of the first terminal device, or may be greater than the channel bandwidth of the first terminal device. If the random access resources are corresponding to the scheduling transmission resources, a configuration granularity of the random access resources may be small, to help the bandwidth-limited terminal device and the ordinary terminal device select a random access resource. This implementation may also be used for MsgA resource selection in the 2-step RACH procedure. For example, a bandwidth of a resource that is corresponding to each of the M random access resources and that is used for sending uplink data (carried on a PUSCH) in the MsgA is less than or equal to the channel bandwidth of the first terminal device.

Alternatively, in still another implementation of the preset resources, the preset resources include K random access resources corresponding to H random access occasions. The H random access occasions belong to P random access occasions. The K random access resources are all or some random access resources corresponding to the H random access occasions. It may be understood that the preset resource is a specific random access resource corresponding to a specific random access occasion. In this case, the first configuration information may be used for configuring the K random access resources corresponding to the H random access occasions. A bandwidth of a resource that is corresponding to each of the K random access resources and that is used for sending a first random access message is less than or equal to the channel bandwidth of the first terminal device. In this case, the third resource may be any one of the K random access resources. In other words, the first terminal device may select one of the K random access resources as the third resource. If the first terminal device selects one of the K random access resources to send the random access request, when the network device receives the random access request message from the first terminal device on the random access resource and allocates a scheduling transmission resource to the first terminal device, the bandwidth of the allocated scheduling transmission resource may be less than or equal to the channel bandwidth of the first terminal device. In addition, such a bandwidth can be supported by the first terminal device, to improve a success rate of sending the Msg3. Alternatively, if a resource used by the first terminal device to send the random access request message is not any one of the K random access resources, when the network device receives the random access request message from the first terminal device and allocates a scheduling transmission resource to the first terminal device, the bandwidth of the allocated scheduling transmission resource may be less than or equal to the channel bandwidth of the first terminal device, or may be greater than the channel bandwidth of the first terminal device. The random access occasions are corresponding to the scheduling transmission resources. This helps reduce an amount of information in the correspondence. If the random access resources are corresponding to the scheduling transmission resources, a configuration granularity of the random access resources may be small, to help the bandwidth-limited terminal device and the ordinary terminal device select a random access resource. In addition, all or some random access resources corresponding to one random access occasion may establish a correspondence to the scheduling transmission resources, so that the random access resources corresponding to the random access occasions are more flexibly used. This implementation may also be used for MsgA resource selection in the 2-step RACH procedure. For example, a bandwidth of a resource that is corresponding to each of the K random access resources and that is used for sending uplink data (carried on a PUSCH) in the MsgA is less than or equal to the channel bandwidth of the first terminal device.

N, M, K, H, and P are all integers greater than or equal to 1, and H is less than or equal to P.

Certainly, in addition to the foregoing setting manner, corresponding preset resources may be set in another manner, and it is specified that a bandwidth of a scheduling transmission resource corresponding to these preset resources is less than or equal to the channel bandwidth of the first terminal device.

Alternatively, the third resource may not be configured by the network device, for example, may be specified in a protocol. For example, the protocol may specify the N random access occasions, or specify the M random access resources, or specify the K random access resources corresponding to the H random access occasions. In this case, S205 does not need to be performed. It can be learned that S205 is an optional step, and is not necessarily performed. Therefore, S205 is represented by a dashed line in FIG. 2.

If the corresponding preset resources are preset in the foregoing manner, after receiving the random access request message from the first terminal device, the network device still needs to allocate a corresponding scheduling transmission resource to the first terminal device. In other words, in the foregoing manner, it is equivalent to that a bandwidth of a scheduling transmission resource corresponding to a corresponding preset resource is set to be less than or equal to the channel bandwidth of the first terminal device, but it is not specified that these preset resources are corresponding to a specific scheduling transmission resource or specific scheduling transmission resources. The network device further needs to allocate a scheduling transmission resource to the first terminal device based on the requirement (to be specific, a bandwidth of a scheduling transmission resource corresponding to the preset resources needs to be less than or equal to the channel bandwidth of the first terminal device).

To reduce burdens on the network device, this embodiment of this disclosure proposes that a correspondence between the preset resources and the scheduling transmission resources may be directly set. For the preset resources and the scheduling transmission resources that have the correspondence, a bandwidth of these scheduling transmission resources is less than or equal to the channel bandwidth of the first terminal device. Herein, for example, the first terminal device is a bandwidth-limited first terminal device. In other words, in addition to the preset resources, the scheduling transmission resources corresponding to these preset resources are set. In this case, after selecting the preset resource, the first terminal device may learn of the corresponding scheduling transmission resource, and may send the Msg3 on the scheduling transmission resource. Although the network device can still send the RAR message (or the PDCCH scheduled by using the TC-RNTI) to the first terminal device after receiving the random access request message from the first terminal device and determining that the random access resource for sending the random access request message is the corresponding preset resource, the network device does not need to allocate the scheduling transmission resource to the first terminal device based on the RAR message (or the PDCCH scheduled by using the TC-RNTI). Instead, the network device may learn of the scheduling transmission resource corresponding to the random access resource based on the correspondence, and therefore can receive the Msg3 from the first terminal device on the scheduling transmission resource. In other words, in this manner, the first resource is also preconfigured.

In a first optional implementation of the correspondence, the preset resources include N random access occasions. In other words, a correspondence between the N random access occasions and the scheduling transmission resources may be set. In this case, the first configuration information may be used for configuring the correspondence between the N random access occasions and the scheduling transmission resources, or the correspondence may be specified in a protocol. Each of the N random access occasions may be corresponding to one or more random access resources, and each random access resource may be corresponding to one or more scheduling transmission resources. Therefore, each of the N random access occasions may be corresponding to at least one scheduling transmission resource. When the first terminal device selects a random access resource corresponding to the corresponding random access occasion to send the random access request message, a bandwidth of the scheduling transmission resource corresponding to the random access resource is less than or equal to the channel bandwidth of the first terminal device. In other words, the first terminal device may send the Msg3 on the scheduling transmission resource whose bandwidth is less than or equal to the channel bandwidth of the first terminal device. In addition, such a bandwidth can be supported by the first terminal device, to improve a success rate of sending the Msg3. In addition, the network device no longer needs to allocate the scheduling transmission resource to the first terminal device. The first terminal device may determine the scheduling transmission resource corresponding to the selected random access occasion based on the correspondence, and therefore send the Msg3 on the corresponding scheduling transmission resource. This reduces resource allocation burdens on the network device. The random access occasions are corresponding to the scheduling transmission resources. This helps reduce an amount of information in the correspondence.

In a second optional implementation of the correspondence, the preset resources include M random access resources. In other words, a correspondence between the M random access resources and the scheduling transmission resources may be set. In this case, the first configuration information may be used for configuring the correspondence between the M random access resources and the scheduling transmission resources, or the correspondence may be specified in a protocol. M is an integer greater than or equal to 1. One random access resource may be corresponding to one or more scheduling transmission resources. Therefore, the M random access resources may be corresponding to at least one scheduling transmission resource. When the first terminal device selects a corresponding random access resource to send the random access request, a bandwidth of the scheduling transmission resource corresponding to the random access resource is less than or equal to the channel bandwidth of the first terminal device. In other words, the first terminal device may send the Msg3 on the scheduling transmission resource whose bandwidth is less than or equal to the channel bandwidth of the first terminal device. In addition, such a bandwidth can be supported by the first terminal device, to improve a success rate of sending the Msg3. In addition, the network device no longer needs to allocate the scheduling transmission resource to the first terminal device. The first terminal device may determine the scheduling transmission resource corresponding to the selected random access resource based on the correspondence, and therefore send the Msg3 on the corresponding scheduling transmission resource. This reduces resource allocation burdens on the network device. If the random access resources are corresponding to the scheduling transmission resources, a configuration granularity in the correspondence may be small, to help the bandwidth-limited first terminal device and the ordinary first terminal device select a random access resource.

In a third optional implementation of the correspondence, the preset resources include K random access resources corresponding to H random access occasions. In other words, a correspondence between the K random access resources corresponding to the H random access occasions and the scheduling transmission resources may be set. In this case, the first configuration information may be used for configuring the correspondence between the K random access resources corresponding to the H random access occasions and the scheduling transmission resources, or the correspondence may be specified in a protocol. The H random access occasions belong to P random access occasions. H, K, and P are all integers greater than or equal to 1, and H is greater than K, or H is less than K, or H is equal to K. H is less than or equal to P. Each of the H random access occasions may be corresponding to one or more random access resources. The K random access resources may be all or some random access resources corresponding to the H random access occasions. One random access resource may be corresponding to one or more scheduling transmission resources. Therefore, the K random access resources may be corresponding to at least one scheduling transmission resource. When the first terminal device selects a corresponding random access resource to send the random access request, a bandwidth of the scheduling transmission resource corresponding to the random access resource is less than or equal to the channel bandwidth of the first terminal device. In other words, the first terminal device may send the Msg3 on the scheduling transmission resource whose bandwidth is less than or equal to the channel bandwidth of the first terminal device. In addition, such a bandwidth can be supported by the first terminal device, to improve a success rate of sending the Msg3. In addition, the network device no longer needs to allocate the scheduling transmission resource to the first terminal device. The first terminal device may determine the scheduling transmission resource corresponding to the selected random access resource based on the correspondence, and therefore send the Msg3 on the corresponding scheduling transmission resource. This reduces resource allocation burdens on the network device. If the random access occasions and the random access resources are corresponding to the scheduling transmission resources, a configuration granularity in the correspondence may be small, to help the bandwidth-limited terminal device and the ordinary terminal device select a random access resource. In addition, all or some random access resources corresponding to one random access occasion may establish a correspondence to the scheduling transmission resources, so that the random access resources corresponding to the random access occasions are more flexibly used.

Certainly, in addition to the foregoing correspondence, the correspondence between the preset resources and the scheduling transmission resources may be set in another manner.

The preset resources in the foregoing need to be resources that can be supported by the bandwidth-limited terminal device. Table 1 shows random access resources that can be supported by the bandwidth-limited terminal device. Optionally, to enable the bandwidth-limited terminal device to support more random access resources and improve a random access success rate of the bandwidth-limited terminal device, subcarrier spacings of random access resources on some random access occasions may be adjusted, so that the adjusted random access resources can meet a requirement of the bandwidth-limited terminal device. For example, the bandwidth-limited terminal device is an NR light terminal device. If a bandwidth of the NR light terminal device is, for example, 5 Mbps, a configuration in the fourteenth row and a configuration in the fifteenth row in Table 1 are not supported by the NR light terminal device. In this case, subcarrier spacings of random access resources (or preambles) on some random access occasions may be temporarily adjusted, so that the NR light terminal device can support the preambles. For example, Table 2 shows adjustments of the subcarrier spacings in the fourteenth row and the fifteenth row in Table 1.

TABLE 2

| $L_{RA}$ | $\Delta f^{RA}$ | $\Delta f$ | $N^{RA}_{RB}$ | $\bar{k}$ |
|---|---|---|---|---|
| 839 | 1.25 | 15 | 6 | 7 |
| 839 | 1.25 | 30 | 3 | 1 |
| 839 | 1.25 | 60 | 2 | 133 |
| 839 | 5 | 15 | 24 | 12 |
| 839 | 5 | 30 | 12 | 10 |
| 839 | 5 | 60 | 6 | 7 |
| 139 | 15 | 15 | 12 | 2 |
| 139 | 15 | 30 | 6 | 2 |
| 139 | 15 | 60 | 3 | 2 |
| 139 | 30 | 15 | 24 | 2 |
| 139 | 30 | 30 | 12 | 2 |
| 139 | 30 | 60 | 6 | 2 |
| 139 | 30 | 60 | 12 | 2 |
| 139 | 30 | 120 | 6 | 2 |
| 139 | 120 | 60 | 24 | 2 |
| 139 | 120 | 120 | 12 | 2 |

The subcarrier spacings corresponding to the preambles in the fourteenth row and the fifteenth row are adjusted from 60 kilohertz (kHz) in Table 1 to 30 kHz in Table 2. After the adjustments, the NR light terminal device with a bandwidth of 5 Mbps can support configurations in the two rows. For example, when sending a random access request message, the NR light terminal device with a bandwidth of 5 Mbps may select a preamble corresponding to either of the two rows.

For example, the third resource may be a random access resource whose subcarrier spacing is not adjusted, or may be a random access resource whose subcarrier spacing is adjusted. If the third resource is a random access resource whose subcarrier spacing is adjusted, before the subcarrier spacing of the third resource is adjusted, the bandwidth of the third resource may be greater than the channel bandwidth of the first terminal device. In other words, before the subcarrier spacing is adjusted, the bandwidth-limited terminal device may not support the third resource, but after the subcarrier spacing is adjusted, the bandwidth-limited terminal device can support the third resource.

S206: The first terminal device sends the first random access message to the network device on the first resource, and the network device receives the first random access message from the first terminal device on the first resource.

After the first resource is determined, the first terminal device may send the first random access message on the first resource. For descriptions of the first random access message, refer to the foregoing descriptions.

In addition, if the first terminal device successfully performs random access, the first terminal device needs to operate under coverage of the network device. Generally, the network device configures a specific parameter for the first terminal device, so that the first terminal device operates under the coverage of the network device based on the specific parameter. The specific parameter includes, for example, a parameter of a specific BWP. The parameter of the specific BWP includes, for example, a parameter such as a bandwidth of the specific BWP. The specific parameter may further include some other configuration parameters. For the bandwidth-limited first terminal device, it is better that the specific parameter allocated by the network device can meet the capability requirement of the first terminal device, so that the first terminal device can properly operate. For example, the bandwidth of the specific BWP of the first terminal device meets the capability requirement of the first terminal device. For example, in an implementation, the bandwidth of the specific BWP of the first terminal device is less than or equal to the channel bandwidth of the first terminal device. The operating bandwidth of the first terminal device may include the uplink channel bandwidth and the downlink channel bandwidth. The specific BWP of the first terminal device may also include an uplink specific BWP and a downlink specific BWP. In this case, that the bandwidth of the specific BWP of the first terminal device is less than or equal to the channel bandwidth of the first terminal device may include that a bandwidth of the uplink specific BWP of the first terminal device is less than or equal to the uplink channel bandwidth of the first terminal device, and a bandwidth of the downlink specific BWP of the first terminal device is less than or equal to the downlink channel bandwidth of the first terminal device.

Therefore, in an optional implementation, regardless of whether the first random access message is the Msg3 or the MsgA, the first random access message may include first information. The first information may include type information of the terminal device, or include type information of a service supported by the terminal device, or include the type information of the terminal device and the type information of the service supported by the terminal device. The type information of the terminal device may be used for determining whether the terminal device is the bandwidth-limited terminal device. In other words, the network device may determine, based on the type information of the terminal device, whether the terminal device is the bandwidth-limited terminal device. For example, if the first random access message includes the first information, it may be indicated that the first random access message is sent by the bandwidth-limited terminal device, or if the first random access message does not include the first information, it may be indicated that the first random access message is not sent by the bandwidth-limited terminal device. For example, the terminal device includes several types: an NR light terminal device, an eMTC terminal device, or an NB-IoT terminal device. In addition, the several types may be further subdivided. For example, the NR light terminal device may further include a type 1 terminal device or a type 2 terminal device. The service supported by the terminal device includes, for example, an industrial sensor service, a wearable service, or a monitoring service. In this embodiment of this disclosure, because the first information is sent by the first terminal device to the network device, if the first information includes the type information of the terminal device, the type information may be the type information of the first terminal device. Similarly, if the first information includes the type information of the service supported by the terminal device, the type information may be the type information of the service supported by the first terminal device. After receiving the first random access message from the first terminal device, the network device may obtain, based on the first information, the type information of the first terminal device and/or the type information of the service supported by the first terminal device. The network device may determine the specific parameter of the first terminal device based on the obtained information, so that the specific parameter configured by the network device can meet the capability requirement of the first terminal device.

S207: The network device sends a downlink message A to the first terminal device, and the first terminal device receives the downlink message A from the network device.

For example, if the first random access message is a Msg3, the downlink message A is a Msg4, or a Radio Resource Control (RRC) message included in the Msg4, or may be another message, for example, an RRC message (for example, an RRC reconfiguration message) existing after the Msg4. Alternatively, if the first random access message is a MsgA, the downlink message A is a MsgB, or an RRC message included in the MsgB, for example, an RRC message (for example, an RRC reconfiguration message) existing after the MsgB, or may be another message. For example, if the random access procedure is used for establishing an RRC connection, the RRC message may be an RRC setup message, or if the random access procedure is used for reestablishing an RRC connection, the RRC message may be an RRC reestablishment message or an RRC setup message. Alternatively, if the first terminal device is in an RRC inactive state before random access, and the random access procedure is used for resuming an RRC connection, the RRC message may be an RRC setup message or an RRC resume message.

If the first random access message includes the first information, the network device may configure, based on the first information, the specific parameter for the terminal device for sending the first information. For example, if the first information indicates that the terminal device for sending the first information is a bandwidth-limited terminal device, the specific parameter configured by the network device for the terminal device based on the first information may be a limited configuration parameter. For example, the bandwidth of the configured specific BWP may be less than or equal to the channel bandwidth of the first terminal device. Alternatively, if the first information indicates that the terminal device for sending the first information is a bandwidth-unlimited terminal device, the specific parameter configured by the network device for the terminal device based on the first information may be a limited configuration parameter. For example, the bandwidth of the configured specific BWP may be less than or equal to the channel bandwidth of the terminal device. Alternatively, the specific parameter configured for the terminal device based on the first information may be an unlimited configuration parameter. For example, the bandwidth of the configured specific BWP may be greater than the channel bandwidth of the terminal device. In this embodiment of this disclosure, the first information is sent by the first terminal device, and the first terminal device is the bandwidth-limited terminal device. Therefore, the specific parameter configured by the network device for the first terminal device based on the first information may be the limited configuration parameter. For example, the bandwidth of the configured specific BWP may be less than or equal to the channel bandwidth of the first terminal device.

Alternatively, in the 4-step RACH procedure, it is specified in advance that the specific parameters corresponding to the preset resources in S201 are limited configuration parameters. For example, the bandwidth of the specific BWP corresponding to the preset resources is less than or equal to the channel bandwidth of the first terminal device. In this case, the first random access message may not include the first information. The specific parameters allocated by the network device to the first terminal device are the limited configuration parameters. For example, the bandwidth of the specific BWP allocated to the first terminal device may be less than or equal to the channel bandwidth of the first terminal device. In this case, it may be considered that the network device determines the specific parameter of the first terminal device based on the third resource.

Alternatively, in the 2-step RACH procedure, it is specified in advance that the specific parameters corresponding to the G resources configured by the network device are limited configuration parameters. For example, the bandwidth of the specific BWP corresponding to each of the G resources is less than or equal to the channel bandwidth of the first terminal device. In this case, the first random access message may not include the first information. The specific parameters allocated by the network device to the first terminal device are limited configuration parameters. For example, the bandwidth of the specific BWP allocated to the first terminal device may be less than or equal to the channel bandwidth of the first terminal device. In this case, it may be considered that the network device determines the specific parameter of the first terminal device based on the first resource.

For the foregoing three cases, after allocating the specific parameter to the terminal device, the network device may send, to the first terminal device based on the downlink message A, configuration information (for example, referred to as specific configuration information) of the specific parameter allocated to the first terminal device. In this case, the downlink message A may also be referred to as a first downlink message. After receiving the first downlink message, the first terminal device may obtain the specific configuration information of the first terminal device based on the first downlink message. In this case, the first downlink message is a Msg4, an RRC message included in the Msg4, an RRC message (for example, an RRC reconfiguration message) existing after the Msg4, a MsgB, an RRC message included in the MsgB, an RRC message (for example, an RRC reconfiguration message) existing after the MsgB, or the like.

Alternatively, if it is not specified in advance that the specific parameters corresponding to the preset resources in S201 are limited configuration parameters, and the first random access message does not include the first information, the network device may properly allocate the specific parameter to the first terminal device. For example, the bandwidth of the specific BWP allocated by the network device to the first terminal device may be less than or equal to the bandwidth of the first terminal device, or may be greater than the bandwidth of the first terminal device. Alternatively, the network device may not allocate the specific parameter to the first terminal device. In this case, the network device may send, to the first terminal device based on the downlink message A, configuration information (for example, referred to as first specific configuration information) of the specific parameter allocated to the first terminal device. In this case, the downlink message A is not the first downlink message. After receiving the downlink message A, the first terminal device may obtain the first specific configuration information of the first terminal device based on the downlink message A.

S208: The first terminal device sends a first uplink message to the network device, and the network device receives the first uplink message from the first terminal device.

It should be noted that the first uplink message does not refer to the Msg3. For example, in the 4-step RACH procedure, for example, the first uplink message is a fifth message (Msg5), or may be another message existing after random access is completed, for example, an RRC message. Alternatively, in the 2-step RACH procedure, for example, the first uplink message is an uplink message sent after the MsgB, for example, an RRC message.

If the first terminal device does not send the first information based on the first random access message, the network device cannot configure, for the first terminal device based on a message such as a Msg4 or a MsgB, a specific parameter that meets a capability of the first terminal device. In other words, it cannot be ensured that the specific parameter configured based on the message such as the Msg4 or the MsgB can meet the bandwidth requirement of the first terminal device, or the network device may not allocate the specific parameter to the first terminal device based on the message such as the Msg4 or the MsgB. For a manner used herein, refer to the description in S206. To be specific, for example, in the 4-step RACH procedure, it is specified in advance that the specific parameters corresponding to the preset resources in S201 are limited configuration parameters. For example, the bandwidth of the specific BWP corresponding to the preset resources is less than or equal to the channel bandwidth of the first terminal device. In this case, the first random access message may include the first information, or may not include the first information. Although the first random access message does not include the first information, the specific parameters allocated by the network device to the first terminal device are the limited configuration parameters. For example, the bandwidth of the specific BWP allocated to the first terminal device may be less than or equal to the channel bandwidth of the first terminal device. Alternatively, for example, in the 2-step RACH procedure, it is specified in advance that the specific parameters corresponding to the G resources configured by the network device are limited configuration parameters. For example, the bandwidth of the specific BWP corresponding to each of the G resources is less than or equal to the channel bandwidth of the first terminal device. In this case, the first random access message may include the first information, or may not include the first information. Although the first random access message does not include the first information, the specific parameters allocated by the network device to the first terminal device are the limited configuration parameters. For example, the bandwidth of the specific BWP allocated to the first terminal device may be less than or equal to the channel bandwidth of the first terminal device.

Alternatively, another manner may be used. To be specific, if the first terminal device does not send the first information based on the first random access message, the first terminal device may send the first information to the network device based on a subsequent first uplink message. After the network device receives the first uplink message from the first terminal device and determines, based on the first information, that the first terminal device is a bandwidth-limited terminal device, if the specific parameter allocated by the network device to the first terminal device based on the message such as the Msg4 or the MsgA does not meet the capability of the first terminal device (for example, the bandwidth of the allocated specific BWP is greater than the channel bandwidth of the first terminal device), or if the network device does not allocate the specific parameter to the first terminal device based on the message such as the Msg4 or the MsgA, the network device may allocate the specific parameter to the first terminal device based on the first information. In this case, the specific parameter allocated by the network device to the first terminal device can meet the actual capability requirement of the first terminal device. For example, the bandwidth of the specific BWP allocated to the first terminal device may be less than or equal to the channel bandwidth of the first terminal device. Alternatively, after the network device determines, based on the first information, that the first terminal device is a bandwidth-unlimited terminal device, if the specific parameter allocated by the network device to the first terminal device based on the message such as the Msg4 or the MsgA does not meet the capability of the first terminal device (for example, the bandwidth of the allocated specific BWP is small), or if the network device does not allocate the specific parameter to the first terminal device based on the message such as the Msg4 or the MsgA, the network device may allocate the specific parameter to the first terminal device based on the first information. In this case, the specific parameter allocated by the network device to the first terminal device can meet the capability requirement of the first terminal device. For example, the bandwidth of the specific BWP of the first terminal device may be large, to fully use the capability of the first terminal device.

The network device may send the specific configuration information to the first terminal device based on a downlink message B. The specific configuration information is used for configuring the specific parameter for the first terminal device. In this case, the downlink message B may be referred to as a first downlink message. However, the message such as the Msg4 or the MsgB in this case cannot be referred to as the first downlink message. For example, refer to S209. The network device sends a downlink message B to the first terminal device, and the first terminal device receives the downlink message B from the network device. The first downlink message may include the specific configuration information allocated by the network device to the first terminal device. For example, the downlink message B is an RRC message, or may be another message. S208 and S209 are optional steps, and are not necessarily performed. Therefore, S208 and S209 are represented by dashed lines in FIG. 2.

In this embodiment of this disclosure, the first terminal device may notify the network device of the type information of the first terminal device and/or the type information of the service supported by the first terminal device, so that the network device can allocate, to the first terminal device, the specific parameter that meets the capability of the first terminal device, and the first terminal device can properly operate. In addition, the first terminal device may send the type information of the first terminal device and/or the type information of the service supported by the first terminal device to the network device based on the message such as the Msg3 or the MsgA, or may send the type information of the first terminal device and/or the type information of the service supported by the first terminal device to the network device based on the other message such as the Msg5. This is flexible.

In addition, in this embodiment of this disclosure, when sending the first random access message, the first terminal device may determine a resource whose bandwidth is less than or equal to the channel bandwidth of the first terminal device as the first resource. For example, the first random access message is a Msg3 or a MsgA. If the bandwidth of the first resource is supported by the first terminal device, the first terminal device can properly send the Msg3 or the MsgA. According to the technical solution provided in this embodiment of this disclosure, even a terminal device with a limited capability can send the Msg3 or the MsgA. Therefore, the technical solution provided in this embodiment of this disclosure can improve a random access success rate of the terminal device.

In addition, in this embodiment of this disclosure, in the 4-step RACH procedure, the preset resources are set but not specific to the bandwidth-limited terminal device, so that even the bandwidth-unlimited terminal device may select the preset resources. The terminal device may further subsequently send the type information of the terminal device and/or the type information of the service supported by the terminal device to the network device, and the network device may allocate the specific BWP to the terminal device based on the information. Therefore, even when the bandwidth-unlimited terminal device uses the preset resources, the capability of the terminal device can still be fully used. In addition, the preset resources are not specific to the bandwidth-limited terminal device. This also reduces a waste of resources.

Next, another question is considered. When the ordinary terminal device operating in an NR system needs to access a cell, the channel bandwidth of the terminal device needs to be greater than or equal to the bandwidth of the initial BWP. The channel bandwidth of the terminal device includes the uplink channel bandwidth and the downlink channel bandwidth. The uplink channel bandwidth of the terminal device needs to be greater than the bandwidth of the initial uplink BWP, and the downlink channel bandwidth of the terminal device needs to be greater than the bandwidth of the initial downlink BWP. Both the bandwidth of the initial uplink BWP and the bandwidth of the initial downlink BWP are configured by the network device based on the SIB1.

However, actually, the channel bandwidth of the NR light terminal device does not need to be greater than the bandwidth of the initial BWP, because this requirement may reduce a cell access success rate of the NR light terminal device. Therefore, a solution may be considered. To be specific, the bandwidth of the initial BWP is limited. For example, the bandwidth of the initial BWP is set to be less than or equal to the channel bandwidth of the NR light terminal device. However, for a cell, all terminal devices covered by the cell share a same initial BWP. If the bandwidth of the initial BWP is limited, a capability of the ordinary terminal device cannot be fully used, causing a waste of the capability and reducing communication quality of the entire cell. In view of this, an embodiment of this disclosure provides a second communication method. The method can resolve the problem, and a bandwidth of an initial BWP of a cell does not need to be adjusted.

Figure 3:
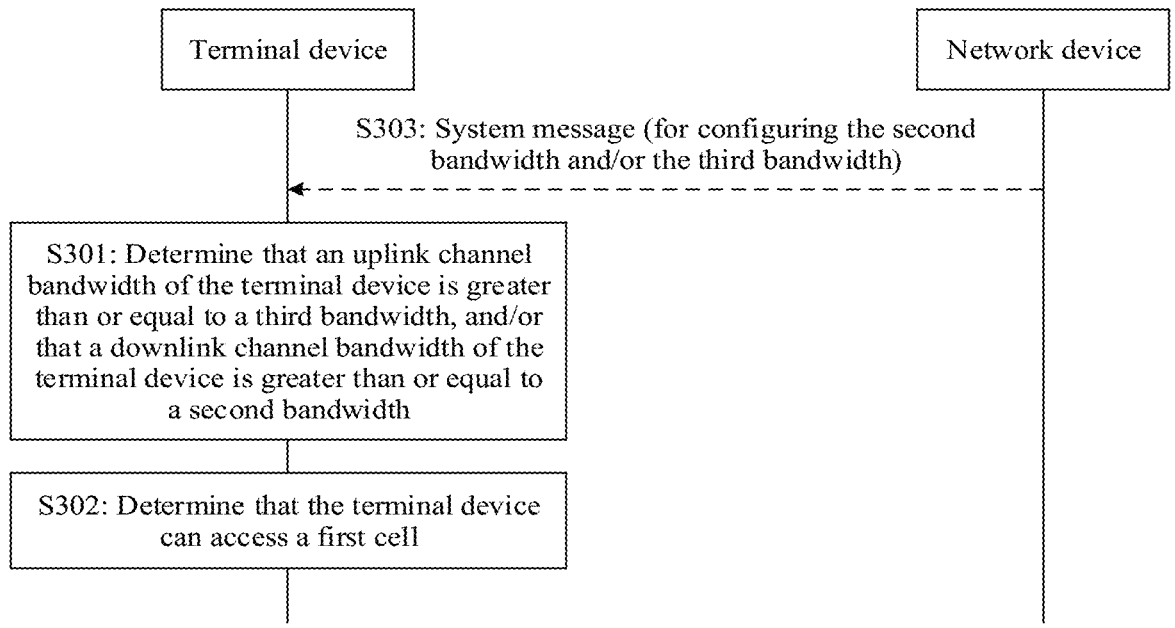
FIG. 3 is a flowchart of a second communication method according to an embodiment of this disclosure.

FIG. 3 is a flowchart of a second communication method according to an embodiment of this disclosure. The following description process uses an example in which the method is applied to a network architecture shown in FIG. 1.

For ease of description, the following uses an example in which the method is performed by a network device and a terminal device. Because this embodiment is applied to the network architecture shown in FIG. 1, the network device described below may be the network device in the network architecture shown in FIG. 1, and the terminal device described below may be the terminal device 1 or the terminal device 2 in the network architecture shown in FIG. 1.

S301: Determine that an uplink channel bandwidth of the terminal device is greater than or equal to a third bandwidth, and/or determine that a downlink channel bandwidth of the terminal device is greater than or equal to a second bandwidth.

For example, the terminal device is a bandwidth-limited terminal device. For an understanding of "bandwidth-limited", refer to related descriptions of the embodiment shown in FIG. 2. For example, the terminal device may be the first terminal device in the embodiment shown in FIG. 2, for example, the NR light terminal device. Alternatively, the terminal device may be a bandwidth-unlimited terminal device. For example, the terminal device in this embodiment of this disclosure may be the second terminal device in the embodiment shown in FIG. 2.

The terminal device may determine whether the uplink channel bandwidth of the terminal device is greater than or equal to the third bandwidth, or determine whether the downlink channel bandwidth of the terminal device is greater than or equal to the second bandwidth, or determine whether the uplink channel bandwidth of the terminal device is greater than or equal to the third bandwidth and determine whether the downlink channel bandwidth of the terminal device is greater than or equal to the second bandwidth. In other words, for the condition of the uplink channel bandwidth and the condition of the downlink channel bandwidth, the terminal device may determine only one condition, or may determine two conditions. If only one condition is determined, the terminal device needs to perform fewer steps, and this helps improve efficiency of accessing a first cell by the terminal device. If two conditions are determined, a determining result may be more accurate. In this embodiment of this disclosure, for example, the terminal device determines that the uplink channel bandwidth of the terminal device is greater than or equal to the third bandwidth, and/or the downlink channel bandwidth of the terminal device is greater than or equal to the second bandwidth.

The third bandwidth may be a bandwidth used by the terminal device to send a random access request message in the first cell. The second bandwidth may be a bandwidth of a CORESET #0. For example, the random access request message is a Msg1, namely, a preamble.

S302: The terminal device determines that the terminal device can access the first cell.

The terminal device determines, in S301, whether the uplink channel bandwidth of the terminal device is greater than or equal to the third bandwidth. In this case, if the uplink channel bandwidth of the terminal device is greater than or equal to the third bandwidth, the terminal device determines that the terminal device can access the first cell, or if the uplink channel bandwidth of the terminal device is less than the third bandwidth, the terminal device determines that the terminal device cannot access the first cell. Alternatively, the terminal device determines, in S301, whether the downlink channel bandwidth of the terminal device is greater than or equal to the second bandwidth. In this case, if the downlink channel bandwidth of the terminal device is greater than or equal to the second bandwidth, the terminal device determines that the terminal device can access the first cell, or if the downlink channel bandwidth of the terminal device is less than the second bandwidth, the terminal device determines that the terminal device cannot access the first cell. Alternatively, the terminal device determines, in S301, whether the uplink channel bandwidth of the terminal device is greater than or equal to the third bandwidth and whether the downlink channel bandwidth of the terminal device is greater than or equal to the second bandwidth. In this case, if the uplink channel bandwidth of the terminal device is greater than or equal to the third bandwidth and the downlink channel bandwidth of the terminal device is greater than or equal to the second bandwidth, the terminal device determines that the terminal device can access the first cell, or if the uplink channel bandwidth of the terminal device is less than the third bandwidth and the downlink channel bandwidth of the terminal device is less than the second bandwidth, the terminal device determines that the terminal device cannot access the first cell.

A bandwidth of a random access resource used by the terminal device to send the random access request message is the third bandwidth. In this case, provided that the uplink channel bandwidth of the terminal device is greater than or equal to the third bandwidth, the terminal device can send the random access request message. A bandwidth of a resource used by the terminal device to receive a random access response message is the bandwidth of the CORESET #0. Therefore, provided that the downlink channel bandwidth of the terminal device is greater than or equal to the second bandwidth, the terminal device can receive the random access response message. If the terminal device can send a random access request message in a cell and/or can receive a random access response message in the cell, this means that the terminal device can access the cell. Therefore, if the terminal device determines that the uplink channel bandwidth of the terminal device is greater than or equal to the third bandwidth, and/or determines that the downlink channel bandwidth of the terminal device is greater than or equal to the second bandwidth, it may be determined that the terminal device can access the first cell.

The third bandwidth and the second bandwidth may be configured based on a system message. For example, before S301, S303 may be further performed. The network device sends the system message in the first cell, and the terminal device receives the system message from the network device in the first cell. The system message may be used for configuring the third bandwidth, or may be used for configuring the second bandwidth, or may be used for configuring the third bandwidth and the second bandwidth. If the system message is used for configuring the third bandwidth, the terminal device may determine the third bandwidth based on the system message, or if the system message is used for configuring the second bandwidth, the terminal device may determine the second bandwidth based on the system message, or if the system message is used for configuring the second bandwidth and the third bandwidth, the terminal device may determine the second bandwidth and the third bandwidth based on the system message. For example, if the system message is used for configuring the second bandwidth but not the third bandwidth, the terminal device may determine, in S301, whether the downlink channel bandwidth of the terminal device is greater than or equal to the second bandwidth, or if the system message is used for configuring the third bandwidth but not the second bandwidth, the terminal device may determine, in S301, whether the uplink channel bandwidth of the terminal device is greater than or equal to the third bandwidth, or if the system message is used for configuring the second bandwidth and the third bandwidth, the terminal device may determine, in S301, whether the downlink channel bandwidth of the terminal device is greater than or equal to the second bandwidth, or determine whether the uplink channel bandwidth of the terminal device is greater than or equal to the third bandwidth, or determine whether the downlink channel bandwidth of the terminal device is greater than or equal to the second bandwidth and whether the uplink channel bandwidth of the terminal device is greater than or equal to the third bandwidth.

For example, the system message is a SIB1. S303 is an optional step, and is not necessarily performed. Therefore, S303 is represented by a dashed line in FIG. 3.

The third bandwidth is generally less than a bandwidth of an initial uplink BWP, and the second bandwidth is generally less than a bandwidth of an initial downlink BWP. Therefore, such specifications in this embodiment of this disclosure improve a cell access success rate of the bandwidth-limited terminal device. In addition, the bandwidth-limited terminal device is less limited when selecting a cell. Therefore, more terminal devices can access a cell.

The embodiment shown in FIG. 3 and the embodiment shown in FIG. 2 may be applied in combination. For example, the terminal device may determine, by using the method provided in the embodiment shown in FIG. 3, whether the terminal device can access the first cell. If the terminal device can access the first cell, the method provided in the embodiment shown in FIG. 2 is then used for sending the random access request message and the like to the network device. Certainly, the method in the embodiment shown in FIG. 3 may be specific to the first cell. In other words, the terminal device sends the random access request message in the first cell, and subsequent steps are also performed in the first cell. After S302, S201 to S208 in the embodiment shown in FIG. 2 may be further performed, or before S201 in the embodiment shown in FIG. 2, S301 to S303 in the embodiment shown in FIG. 3 may be further performed.

Alternatively, the embodiment shown in FIG. 3 and the embodiment shown in FIG. 2 may be applied separately without affecting each other.

With reference to the accompanying drawings, the following describes apparatuses configured to implement the foregoing methods in embodiments of this disclosure. Therefore, all the foregoing content may be used in the following embodiments. Repeated content is not described again.

Figure 4:
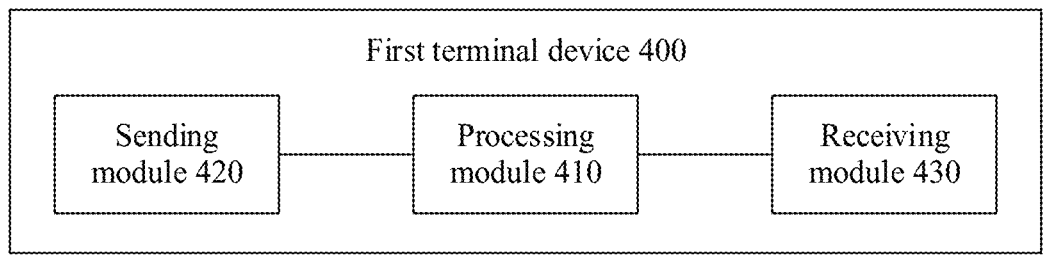
FIG. 4 is a schematic block diagram of a first terminal device according to an embodiment of this disclosure.

FIG. 4 is a schematic block diagram of a communication apparatus 400 according to an embodiment of this disclosure. For example, the communication apparatus 400 is, for example, a first terminal device 400.

The first terminal device 400 includes a processing module 410 and a sending module 420. Optionally, the first terminal device 400 may further include a receiving module 430. For example, the first terminal device 400 may be a terminal device, or may be a chip used in the terminal device, or another combined device or a component that has functions of the terminal device. When the first terminal device 400 is a network device, the sending module 420 may be a transmitter, and the receiving module 430 may be a receiver. The transmitter may include an antenna, a radio frequency circuit, and the like. The receiver may also include an antenna, a radio frequency circuit, and the like. The transmitter and the receiver may belong to one functional module, for example, may be referred to as a transceiver. Alternatively, the transmitter and the receiver may be functional modules independent of each other. The processing module 410 may be a processor, for example, a baseband processor. The baseband processor may include one or more central processing units (CPUs). When the first terminal device 400 is a component that has the functions of the network device, the sending module 420 and the receiving module 430 may be radio frequency units, and the processing module 410 may be a processor, for example, a baseband processor. When the first terminal device 400 is a chip system, the sending module 420 and the receiving module 430 may be input/output interfaces of a chip (for example, a baseband chip). For example, the sending module 420 is an output interface, and the receiving module 430 is an input interface. Alternatively, the input interface and the output interface are a same interface. In this case, both the sending module 420 and the receiving module 430 are the interface. The processing module 410 may be a processor of the chip system, and may include one or more central processing units. It should be understood that, in this embodiment of this disclosure, the processing module 410 may be implemented by using a processor or a processor-related circuit component, the sending module 420 may be implemented by using a transmitter or a transmitter-related circuit component, and the receiving module 430 may be implemented by using a receiver or a receiver-related circuit component.

For example, the processing module 410 may be configured to perform all operations, such as S201, that are performed by the first terminal device in the embodiment shown in FIG. 2 except sending and receiving operations, and/or configured to support another process of the technology described in this specification. The sending module 420 may be configured to perform all sending operations, such as S203, S206, and S208, that are performed by the first terminal device in the embodiment shown in FIG. 2, and/or configured to support another process of the technology described in this specification. The receiving module 430 may be configured to perform all receiving operations, such as S202, S204, S205, S207, and S209, that are performed by the first terminal device in the embodiment shown in FIG. 2, and/or configured to support another process of the technology described in this specification.

In addition, the sending module 420 and the receiving module 430 may be a functional module. The functional module may be referred to as a transceiver module. The transceiver module can implement both a sending operation and a receiving operation. For example, the transceiver module may be configured to perform all sending operations and receiving operations that are performed by the first terminal device in the embodiment shown in FIG. 2. For example, when performing a sending operation, the transceiver module may be considered as a sending module, and when performing a receiving operation, the transceiver module may be considered as a receiving module. Alternatively, the sending module 420 and the receiving module 430 may be two functional modules. The transceiver module may be considered as a general term of the two functional modules. The sending module 420 is configured to implement a sending operation. For example, the sending module 420 may be configured to perform all sending operations that are performed by the first terminal device in any embodiment of the embodiment shown in FIG. 2. The receiving module 430 is configured to implement a receiving operation. For example, the receiving module 430 may be configured to perform all receiving operations that are performed by the first terminal device in the embodiment shown in FIG. 2.

The processing module 410 is configured to determine a first resource.

The sending module 420 is configured to send a first random access message on the first resource. A bandwidth of the first resource is less than or equal to a channel bandwidth of the first terminal device 400. The channel bandwidth of the first terminal device 400 is less than or equal to a channel bandwidth of a second terminal device. The channel bandwidth of the second terminal device is greater than or equal to a first bandwidth. The first bandwidth is configured by the network device.

In an optional implementation, the first resource is a part of a second resource. The second resource is used by the second terminal device to send a first random access message. A bandwidth of the second resource is less than or equal to the first bandwidth.

In an optional implementation, the sending module 420 is further configured to send a random access request message on a third resource, where the third resource is a part of a fourth resource, and the fourth resource is used by the second terminal device to send a random access request message, and the receiving module 430 is configured to receive a random access response message, where the random access response message is used for scheduling the first resource.

In an optional implementation, the third resource is a random access resource corresponding to a first random access occasion, the first random access occasion is one of N random access occasions, a bandwidth of a resource that is corresponding to each of the N random access occasions and that is used for sending a first random access message is less than or equal to the channel bandwidth of the first terminal device 400, the third resource is one of M random access resources, and a bandwidth of a resource that is corresponding to each of the M random access resources and that is used for sending a first random access message is less than or equal to the channel bandwidth of the first terminal device 400, or the third resource is one of K random access resources, the K random access resources are corresponding to H random access occasions, the H random access occasions belong to P random access occasions, and a bandwidth of a resource that is corresponding to each of the K random access resources and that is used for sending a first random access message is less than or equal to the channel bandwidth of the first terminal device 400.

N, M, K, H, and P are all integers greater than or equal to 1, and H is less than or equal to P.

In an optional implementation, the receiving module 430 is further configured to receive a first downlink message from the network device. The first downlink message includes specific configuration information of the first terminal device 400. The specific configuration information is used for configuring a specific parameter.

In an optional implementation, the specific configuration information includes configuration information of a specific BWP. A bandwidth of the specific BWP is less than or equal to the channel bandwidth of the first terminal device 400.

In an optional implementation, the third resource is used for determining the specific parameter, and the third resource is used for sending the random access request message, the first resource is used for determining the specific parameter, the first random access message includes first information, and the first information is used for determining the specific parameter, or the sending module 420 is further configured to send a first uplink message to the network device, where the first uplink message includes first information, and the first information is used for determining the specific parameter.

The first information includes type information of the first terminal device 400 and/or type information of a service, and the service is a service supported by the first terminal device 400.

In an optional implementation, the third resource is a random access resource whose subcarrier spacing is adjusted. A bandwidth of the third resource existing before the subcarrier spacing is adjusted is greater than the channel bandwidth of the first terminal device 400.

In an optional implementation, the channel bandwidth of the first terminal device 400 includes an uplink channel bandwidth and a downlink channel bandwidth. The processing module 410 is further configured to determine that the uplink channel bandwidth of the first terminal device 400 is greater than or equal to a third bandwidth, and/or that the downlink channel bandwidth of the first terminal device 400 is greater than or equal to a second bandwidth, where the third bandwidth is a bandwidth for sending a random access request message in a first cell covered by the network device, and the second bandwidth is a bandwidth of a control resource set 0, and determine that the first terminal device 400 can access the first cell.

In an optional implementation, the receiving module 430 is further configured to receive a system message in the first cell, and the processing module 410 is further configured to determine the second bandwidth and the third bandwidth based on the system message.

In an optional implementation, the bandwidth of the control resource set 0 is less than or equal to the first bandwidth.

For other functions that can be implemented by the first terminal device 400, refer to the related descriptions in the embodiment shown in FIG. 2. Details are not described again.

Figure 5:
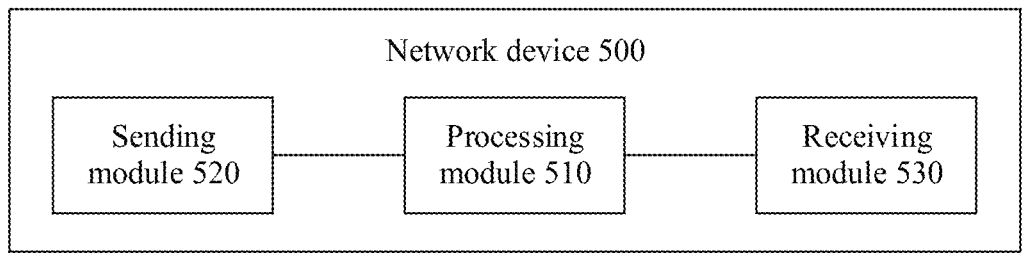
FIG. 5 is a schematic block diagram of a network device according to an embodiment of this disclosure.

FIG. 5 is a schematic block diagram of a communication apparatus 500 according to an embodiment of this disclosure. For example, the communication apparatus 500 is, for example, a network device 500.

The network device 500 includes a sending module 520 and a receiving module 530. Optionally, the network device 500 may further include a processing module 510. For example, the network device 500 may be a network device, or may be a chip used in the network device or another combined device or a component that has functions of the network device. When the network device 500 is a network device, the sending module 520 may be a transmitter, and the receiving module 530 may be a receiver. The transmitter may include an antenna, a radio frequency circuit, and the like. The receiver may also include an antenna, a radio frequency circuit, and the like. The transmitter and the receiver may belong to one functional module, for example, may be referred to as a transceiver. Alternatively, the transmitter and the receiver may be functional modules independent of each other. The processing module 510 may be a processor, for example, a baseband processor. The baseband processor may include one or more CPUs. When the network device 500 is a component that has the functions of the network device, the sending module 520 and the receiving module 530 may be radio frequency units, and the processing module 510 may be a processor, for example, a baseband processor. When the network device 500 is a chip system, the sending module 520 and the receiving module 530 may be input/output interfaces of a chip (for example, a baseband chip). For example, the sending module 520 is an output interface, and the receiving module 530 is an input interface. Alternatively, the input interface and the output interface are a same interface. In this case, both the sending module 520 and the receiving module 530 are the interface. The processing module 510 may be a processor of the chip system, and may include one or more central processing units. It should be understood that, in this embodiment of this disclosure, the processing module 510 may be implemented by using a processor or a processor-related circuit component, the sending module 520 may be implemented by using a transmitter or a transmitter-related circuit component, and the receiving module 530 may be implemented by using a receiver or a receiver-related circuit component.

For example, the processing module 510 may be configured to perform all operations, such as the operation of configuring the specific parameter for the first terminal device, that are performed by the network device in the embodiment shown in FIG. 2 except sending and receiving operations, and/or configured to support another process of the technology described in this specification. The sending module 520 may be configured to perform all sending operations, such as S202, S204, S205, S207, and S209, that are performed by the network device in the embodiment shown in FIG. 2, and/or configured to support another process of the technology described in this specification. The receiving module 530 may be configured to perform all receiving operations, such as S203, S206, and S208, that are performed by the network device in the embodiment shown in FIG. 2, and/or configured to support another process of the technology described in this specification.

In addition, for implementations of the sending module 520 and the receiving module 530, refer to the descriptions of the implementations of the sending module 420 and the receiving module 430.

The receiving module 530 is configured to receive a first random access message from a first terminal device on a first resource. A bandwidth of the first resource is less than or equal to a channel bandwidth of the first terminal device. The channel bandwidth of the first terminal device is less than or equal to a channel bandwidth of a second terminal device. The channel bandwidth of the second terminal device is greater than or equal to a first bandwidth. The first bandwidth is configured by the network device.

The sending module 520 is configured to send a first downlink message to the first terminal device. The first downlink message includes specific configuration information. The specific configuration information is used for configuring a specific parameter.

In an optional implementation, the specific configuration information includes configuration information of a specific BWP. A bandwidth of the specific BWP is less than or equal to the channel bandwidth of the first terminal device.

In an optional implementation, the receiving module 530 is further configured to receive a random access request message from the first terminal device on a third resource, where the specific parameter is determined based on the third resource, the specific parameter is determined based on the first resource, the first random access message includes first information, and the specific parameter is determined based on the first information, or the receiving module 530 is further configured to receive a first uplink message from the first terminal device, where the specific parameter is determined based on first information included in the first uplink message.

The first information includes type information of the first terminal device and/or type information of a service, and the service is a service supported by the first terminal device.

In an optional implementation, the receiving module 530 is further configured to receive the random access request message from the first terminal device on the third resource, where the third resource is a part of a fourth resource, and the fourth resource is used for receiving a random access request message from the second terminal device, and the sending module 520 is further configured to send a random access response message to the first terminal device, where the random access response message is used for scheduling the first resource.

In an optional implementation, the sending module 520 is further configured to send first configuration information to the first terminal device.

The first configuration information is used for configuring N random access occasions, and a bandwidth of a resource that is corresponding to each of the N random access occasions and that is used for sending a first random access message is less than or equal to the channel bandwidth of the first terminal device, the first configuration information is used for configuring M random access resources, and a bandwidth of a resource that is corresponding to each of the M random access resources and that is used for sending a first random access message is less than or equal to the channel bandwidth of the first terminal device, or the first configuration information is used for configuring K random access resources corresponding to H random access occasions, the H random access occasions belong to P random access occasions, and a bandwidth of a resource that is corresponding to each of the K random access resources and that is used for sending a first random access message is less than or equal to the channel bandwidth of the first terminal device.

N, M, K, H, and P are all integers greater than or equal to 1, and H is less than or equal to P.

In an optional implementation, the sending module 520 is further configured to send second configuration information to the first terminal device. The second configuration information is used for configuring a second resource. The second resource is used by the second terminal device to send a first random access message. A bandwidth of the second resource is less than or equal to the first bandwidth. The first resource is a part of the second resource.

For other functions that can be implemented by the network device 500, refer to the related descriptions in the embodiment shown in FIG. 2. Details are not described again.

Figure 6:
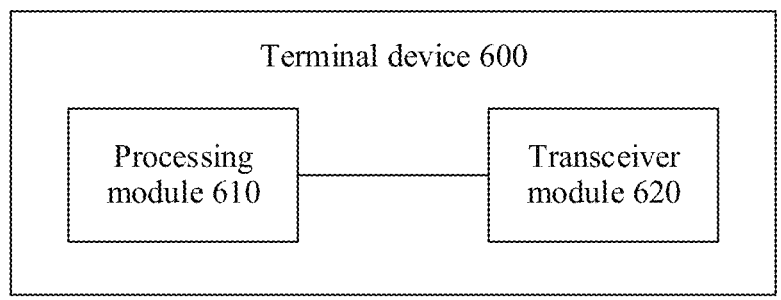
FIG. 6 is a schematic block diagram of a terminal device according to an embodiment of this disclosure.

FIG. 6 is a schematic block diagram of a communication apparatus 600 according to an embodiment of this disclosure. For example, the communication apparatus 600 is, for example, a terminal device 600.

The terminal device 600 includes a processing module 610 and a transceiver module 620. For example, the terminal device 600 may be a terminal device, or may be a chip used in the terminal device, or another combined device or a component that has functions of the terminal device. When the terminal device 600 is the terminal device, the transceiver module 620 may be a transceiver. The transceiver may include an antenna, a radio frequency circuit, and the like. The processing module 610 may be a processor, for example, a baseband processor. The baseband processor may include one or more CPUs. When the terminal device 600 is the component that has the functions of the terminal device, the transceiver module 620 may be a radio frequency unit, and the processing module 610 may be a processor, for example, a baseband processor. When the terminal device 600 is a chip system, the transceiver module 620 may be an input/output interface of a chip (for example, a baseband chip), and the processing module 610 may be a processor of the chip system, and may include one or more central processing units. It should be understood that the processing module 610 in this embodiment of this disclosure may be implemented by using a processor or a processor-related circuit component, and the transceiver module 620 may be implemented by using a transceiver or a transceiver-related circuit component.

For example, the processing module 610 may be configured to perform all operations, such as S301 and S302, that are performed by the terminal device in the embodiment shown in FIG. 3 except sending and receiving operations, and/or configured to support another process of the technology described in this specification. The transceiver module 620 may be configured to perform all the sending and receiving operations, such as S303, that are performed by the terminal device in the embodiment shown in FIG. 3, and/or configured to support another process of the technology described in this specification.

In addition, for implementations of the transceiver module 620, refer to the descriptions of the implementations of the sending module 420 and the receiving module 430.

The transceiver module 620 is configured to communicate with another apparatus.

The processing module 610 is configured to determine that an uplink channel bandwidth of the terminal device 600 is greater than or equal to a third bandwidth, and/or that a downlink channel bandwidth of the terminal device 600 is greater than or equal to a second bandwidth. The third bandwidth is a bandwidth for sending a random access request message in a first cell. The second bandwidth is a bandwidth of a control resource set 0.

The processing module 610 is further configured to determine that the terminal device 600 can access the first cell.

In an optional implementation, the transceiver module 620 is configured to receive a system message in the first cell, and the processing module 610 is further configured to determine the third bandwidth and the second bandwidth based on the system message.

In an optional implementation, the bandwidth of the control resource set 0 is less than or equal to a bandwidth of an initial BWP.

For other functions that can be implemented by the terminal device 600, refer to the related descriptions in the embodiment shown in FIG. 3. Details are not described again.

An embodiment of this disclosure further provides a communication apparatus. The communication apparatus may be a terminal device, or may be a circuit. The communication apparatus may be configured to perform an action performed by the terminal device in the foregoing method embodiment.

Figure 7:
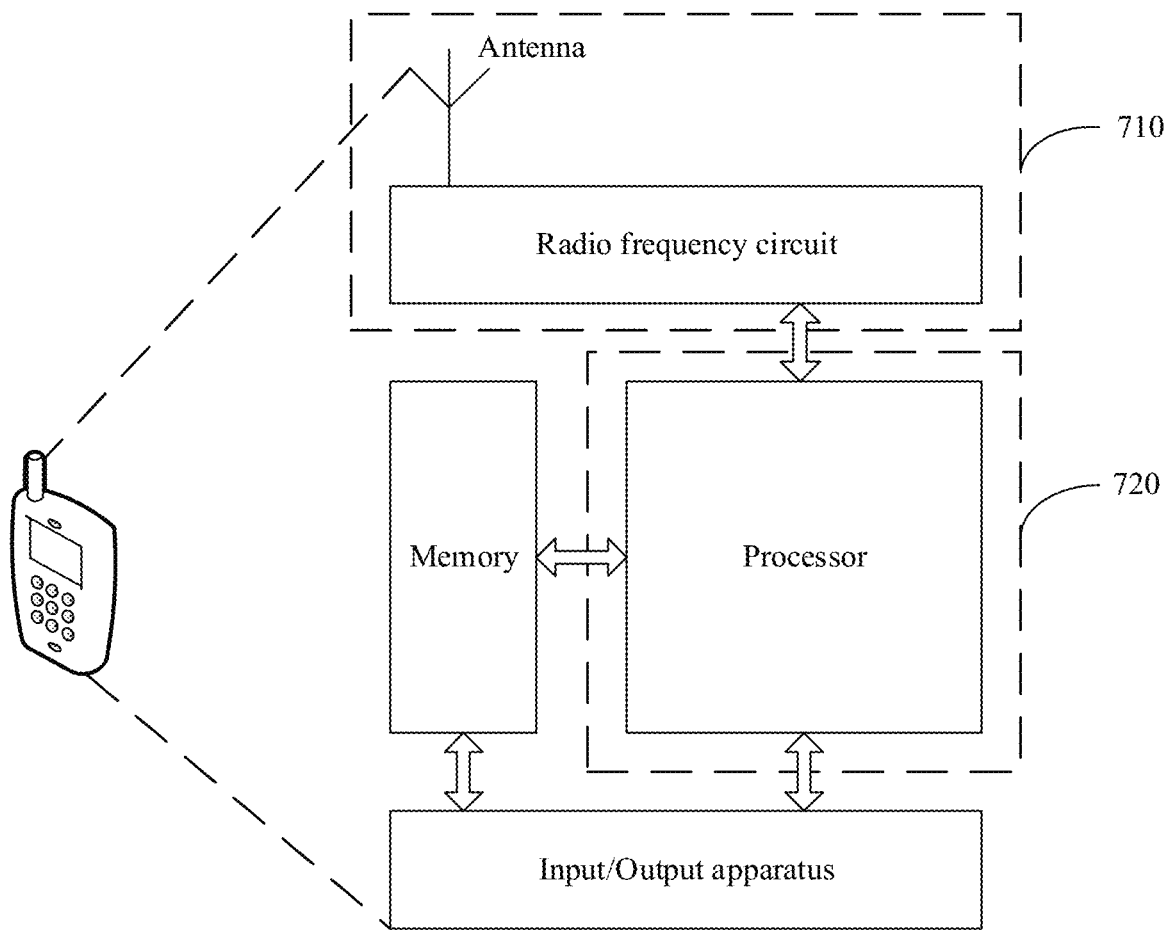
FIG. 7 is a schematic block diagram of a communication apparatus according to an embodiment of this disclosure.

When the communication apparatus is the terminal device, FIG. 7 is a simplified schematic diagram of a structure of the terminal device. For ease of understanding and convenience of figure illustration, an example in which the terminal device is a mobile phone is used in FIG. 7. As shown in FIG. 7, the terminal device includes a processor, a memory, a radio frequency circuit, an antenna, and an input/output apparatus. The processor is mainly configured to process a communication protocol and communication data, control the terminal device, execute a software program, process data of the software program, and the like. The memory is mainly configured to store the software program and data. The radio frequency circuit is mainly configured to perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to receive data input by a user and output data to the user. It should be noted that some types of terminal devices may have no input/output apparatus.

When needing to send data, after performing baseband processing on the to-be-sent data, the processor outputs a baseband signal to the radio frequency circuit, and the radio frequency circuit performs radio frequency processing on the baseband signal and then sends the radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 7 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in embodiments of this disclosure.

In this embodiment of this disclosure, the antenna and the radio frequency circuit that have sending and receiving functions may be considered as a transceiver unit of the terminal device (where the transceiver unit may be one functional unit, and the functional unit can implement the sending and receiving functions, or the transceiver unit may include two functional units, namely, a receiving unit that can implement the receiving function and a sending unit that can implement the sending function), and the processor that has a processing function is considered as a processing unit of the terminal device. As shown in FIG. 7, the terminal device includes a transceiver unit 710 and a processing unit 720. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 710 and that is configured to implement a receiving function may be considered as a receiving unit, and a component that is in the transceiver unit 710 and that is configured to implement a sending function may be considered as a sending unit. That is, the transceiver unit 710 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 710 is configured to perform a sending operation and a receiving operation on a terminal device side in the foregoing method embodiments, and the processing unit 720 is configured to perform an operation other than the receiving operation and the sending operation of the terminal device in the foregoing method embodiments.

For example, in an implementation, the processing unit 720 may be configured to perform all operations, such as S201, that are performed by the first terminal device in the embodiment shown in FIG. 2 except sending and receiving operations, and/or configured to support another process of the technology described in this specification. The transceiver unit 710 may be configured to perform all the sending and receiving operations, such as S202 to S209, that are performed by the first terminal device in the embodiment shown in FIG. 2, and/or configured to support another process of the technology described in this specification.

For another example, in an implementation, the processing unit 720 may be configured to perform all operations, such as S301 and S302, that are performed by the terminal device in the embodiment shown in FIG. 3 except sending and receiving operations, and/or configured to support another process of the technology described in this specification. The transceiver unit 710 may be configured to perform all the sending and receiving operations, such as S303, that are performed by the terminal device in the embodiment shown in FIG. 3, and/or configured to support another process of the technology described in this specification.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

Figure 8:
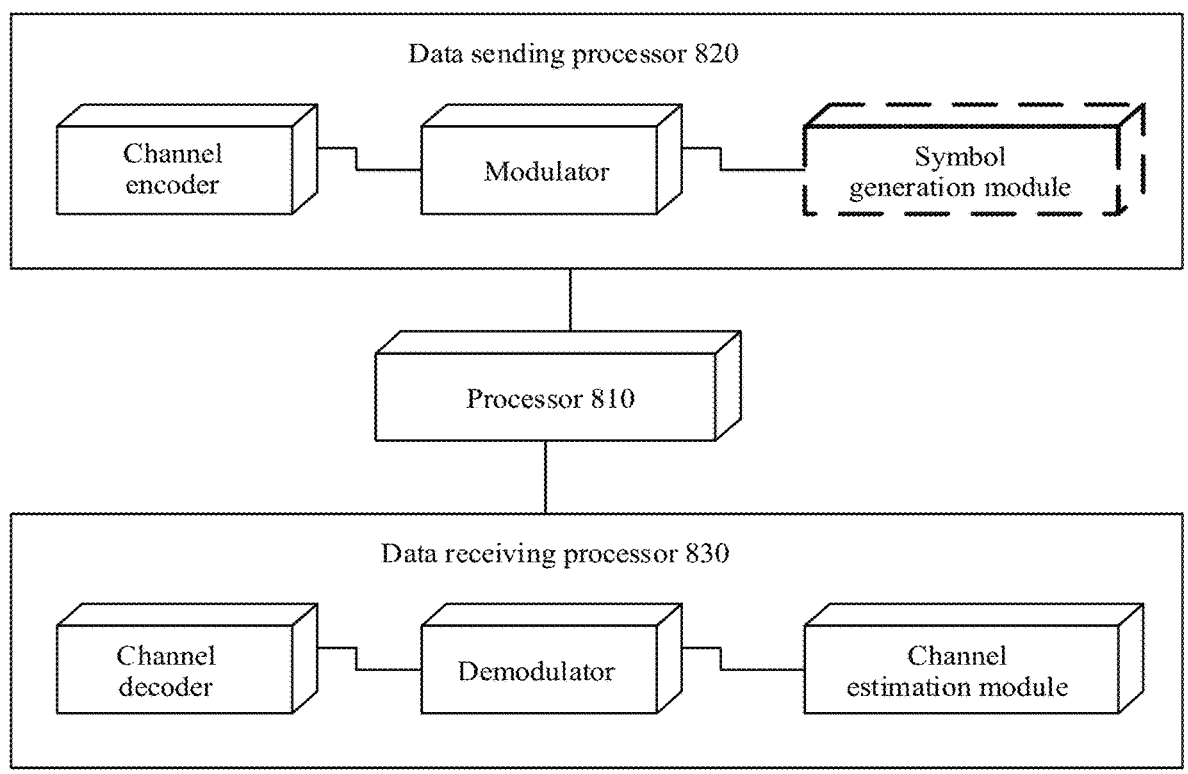
FIG. 8 is another schematic block diagram of a communication apparatus according to an embodiment of this disclosure.

When the communication apparatus in this embodiment is the terminal device, refer to a device shown in FIG. 8. For example, the device can implement a function similar to that of the processing module 410 in FIG. 4. For another example, the device can implement a function similar to that of the processing module 610 in FIG. 6. In FIG. 8, the device includes a processor 810, a data sending processor 820, and a data receiving processor 830. The processing module 410 in the foregoing embodiment may be the processor 810 in FIG. 8, and implements a corresponding function. The sending module 420 in the foregoing embodiment may be the data sending processor 820 in FIG. 8, and implement a corresponding function. The receiving module 430 in the foregoing embodiment may be the data receiving processor 830 in FIG. 8, and implement a corresponding function. Alternatively, the processing module 610 in the foregoing embodiment may be the processor 810 in FIG. 8, and implement a corresponding function. The transceiver module 620 in the foregoing embodiment may be the data sending processor 820 and/or the data receiving processor 830 in FIG. 8, and implement a corresponding function. Although FIG. 8 shows a channel encoder and a channel decoder, it may be understood that these modules are merely examples, and do not constitute a limitation on this embodiment.

Figure 9:
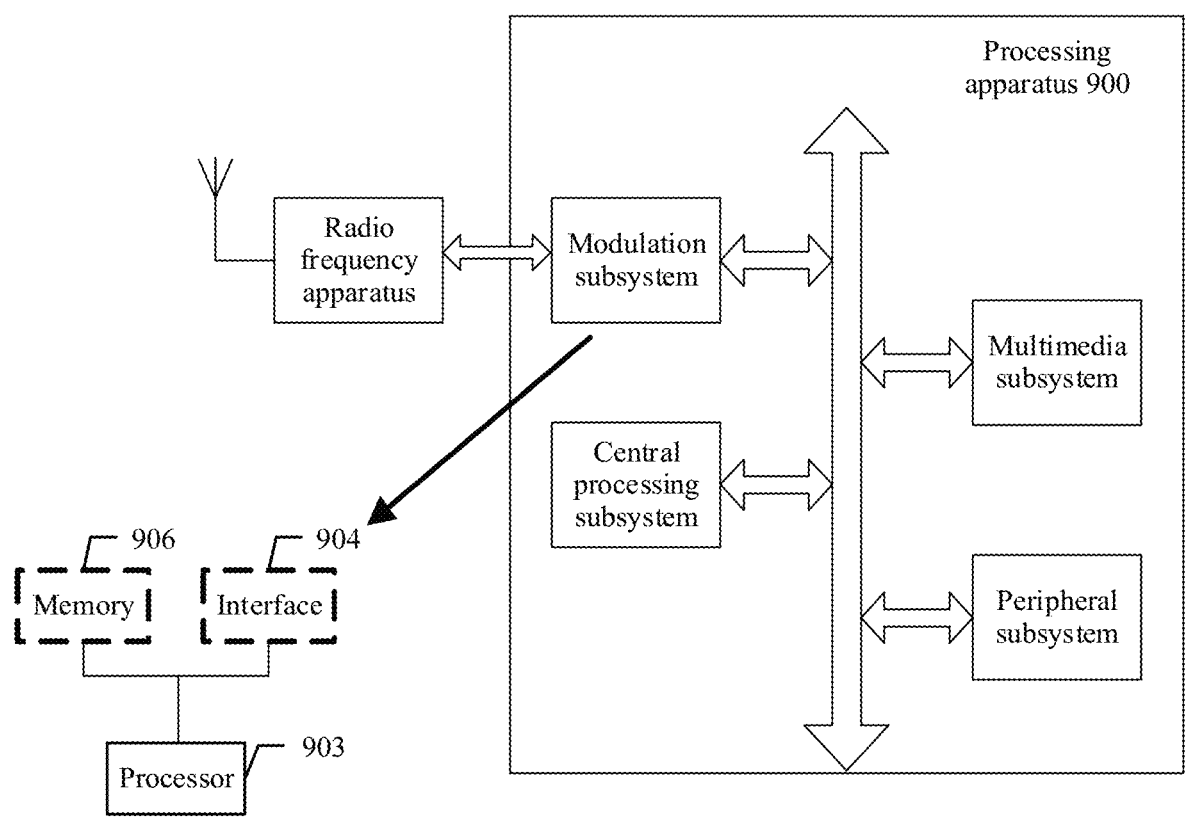
FIG. 9 is still another schematic block diagram of a communication apparatus according to an embodiment of this disclosure.

FIG. 9 shows another form of this embodiment. A processing apparatus 900 includes modules such as a modulation subsystem, a central processing subsystem, and a peripheral subsystem. The communication apparatus in this embodiment may be used as the modulation subsystem. Further, the modulation subsystem may include a processor 903 and an interface 904. The processor 903 implements the function of the processing module 410. The interface 904 implements the functions of the sending module 420 and the receiving module 430. Alternatively, the processor 903 implements the function of the processing module 610. The interface 904 implements the function of the transceiver module 620. In another variation, the modulation subsystem includes a memory 906, a processor 903, and a program that is stored in the memory 906 and that can be run on the processor. When executing the program, the processor 903 implements the method on the terminal device side in the foregoing method embodiments. It should be noted that the memory 906 may be nonvolatile or volatile. The memory 906 may be located in the modulation subsystem, or may be located in the processing apparatus 900, provided that the memory 906 can be connected to the processor 903.

Figure 10:
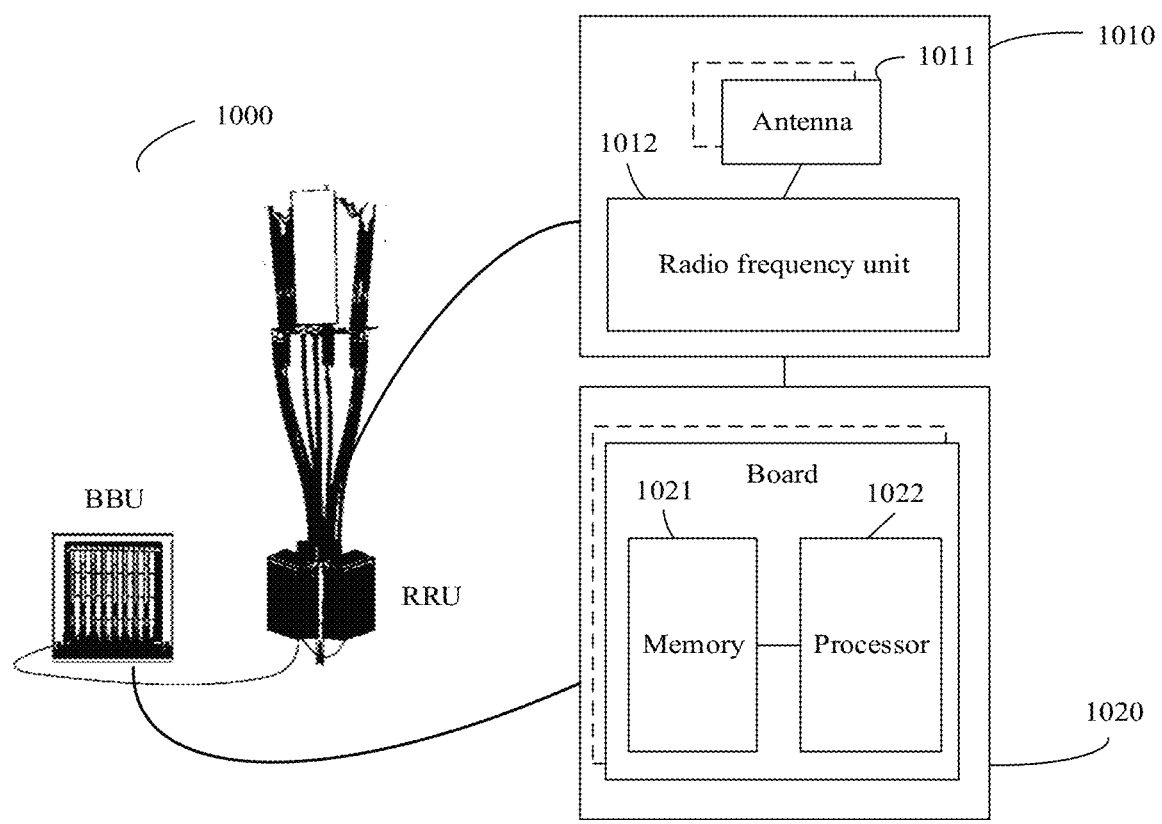
FIG. 10 is yet another schematic block diagram of a communication apparatus according to an embodiment of this disclosure.

When the apparatus in this embodiment of this disclosure is a network device, the apparatus may be shown in FIG. 10. The apparatus 1000 includes one or more radio frequency units, such as a remote radio unit (RRU) 1010 and one or more baseband units (BBUs) (or digital units (DUs)) 1020. The RRU 1010 may be referred to as a transceiver module. The transceiver module may include a sending module and a receiving module, or the transceiver module may be a module that can implement sending and receiving functions. The transceiver module may correspond to the sending module 520 in FIG. 5. Optionally, the transceiver module may also be referred to as a transceiver machine, a transceiver circuit, a transceiver, or the like, and may include at least one antenna 1011 and a radio frequency unit 1012. The RRU 1010 is mainly configured to send and receive a radio frequency signal, and perform conversion between the radio frequency signal and a baseband signal. For example, the RRU 1010 is configured to send indication information to a terminal device. The BBU 1020 is mainly configured to perform baseband processing, control a base station, and the like. The RRU 1010 and the BBU 1020 may be physically disposed together, or may be physically disposed separately, namely, a distributed base station.

The BBU 1020 is a control center of the base station, and may also be referred to as a processing module. The BBU 1020 may correspond to the processing module 510 in FIG. 5, and is mainly configured to implement a baseband processing function such as channel coding, multiplexing, modulation, or spreading. For example, the BBU (the processing module) may be configured to control the base station to perform an operation procedure related to the network device in the foregoing method embodiment, for example, generate the foregoing indication information.

In an example, the BBU 1020 may include one or more boards. A plurality of boards may jointly support a radio access network (for example, an LTE network) in a single access standard, or may separately support radio access networks (for example, an LTE network, a 5G network, and another network) in different access standards. The BBU 1020 further includes a memory 1021 and a processor 1022. The memory 1021 is configured to store necessary instructions and data. The processor 1022 is configured to control the base station to perform a necessary action, for example, control the base station to perform the operation procedure related to the network device in the foregoing method embodiments. The memory 1021 and the processor 1022 may serve one or more boards. In other words, a memory and a processor may be disposed on each board. Alternatively, a plurality of boards may share a same memory and a same processor. In addition, a necessary circuit may further be disposed on each board.

An embodiment of this disclosure provides a first communication system. The first communication system may include the first terminal device in the embodiment shown in FIG. 2, and include the network device in the embodiment shown in FIG. 2. For example, the first terminal device is the first terminal device 400 in FIG. 4. For example, the network device is the network device 500 in FIG. 5.

An embodiment of this disclosure provides a second communication system. The second communication system may include the terminal device in the embodiment shown in FIG. 3. For example, the terminal device is the terminal device 600 in FIG. 6.

The terminal device 600 and the first terminal device 400 may be a same terminal device, or may be different terminal devices. If the terminal device 600 and the first terminal device 400 are the same terminal device, the first communication system and the second communication system may be considered as a same communication system.

An embodiment of this disclosure further provides a computer-readable storage medium. The computer-readable storage medium stores a computer program. When the computer program is executed by a computer, the computer may implement a procedure related to the network device provided in the method embodiment shown in FIG. 2.

An embodiment of this disclosure further provides a computer-readable storage medium. The computer-readable storage medium is configured to store a computer program. When the computer program is executed by a computer, the computer may implement a procedure related to the first terminal device provided in the method embodiment shown in FIG. 2.

An embodiment of this disclosure further provides a computer-readable storage medium. The computer-readable storage medium stores a computer program. When the computer program is executed by a computer, the computer may implement a procedure related to the terminal device provided in the method embodiment shown in FIG. 3.

An embodiment of this disclosure further provides a computer program product. The computer program product is configured to store a computer program. When the computer program is executed by a computer, the computer may implement a procedure related to the network device provided in the method embodiment shown in FIG. 2.

An embodiment of this disclosure further provides a computer program product. The computer program product is configured to store a computer program. When the computer program is executed by a computer, the computer may implement a procedure related to the first terminal device provided in the method embodiment shown in FIG. 2.

An embodiment of this disclosure further provides a computer program product. The computer program product is configured to store a computer program. When the computer program is executed by a computer, the computer may implement a procedure related to the terminal device provided in the method embodiment shown in FIG. 3.

It should be understood that the processor in this embodiment of this disclosure may be a CPU, or may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, or the processor may be any conventional processor, or the like.

It can be further understood that the memory in this embodiment of this disclosure may be a volatile memory or a nonvolatile memory, or may include the volatile memory and the nonvolatile memory. The non-volatile memory may be a read-only memory (ROM), a programmable ROM (PROM), an erasable PROM (EPROM), an electrically EPROM (EEPROM), or a flash memory. The volatile memory may be a random-access memory (RAM), which is used as an external cache. Through example but not limitative description, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a synchronous link DRAM (SLDRAM), and a direct rambus (DR) RAM.

It should be noted that when the processor is a general purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

It should be understood that, in embodiments of this disclosure, sequence numbers of the foregoing processes do not mean execution sequences. The execution sequences of the processes should be determined based on functions and internal logic of the processes, and should not constitute any limitation on implementation processes of embodiments of this disclosure.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this disclosure. The foregoing computer-readable storage medium may be any usable medium accessible by a computer. The computer-readable medium may include, for example but not limited to, a RAM, a ROM, an EEPROM, a compact disc (CD) ROM (CD-ROM), a universal serial bus flash disk, a removable hard disk or another compact disc storage, a magnetic disk storage medium or another magnetic storage device, or any other medium that can be used for carrying or storing expected program code in a form of an instruction or a data structure and that can be accessed by a computer.

The foregoing descriptions are merely specific implementations of this disclosure, but are not intended to limit the protection scope of embodiments of this disclosure. Any variation or replacement readily figured out by a person skilled in the art within the technical scope disclosed in embodiments of this disclosure shall fall within the protection scope of embodiments of this disclosure. Therefore, the protection scope of embodiments of this disclosure shall be subject to the protection scope of the claims.

What is claimed is:

1. A communication method implemented by a first terminal device or a chip in a first terminal device, wherein the communication method comprises:
    sending, using a first resource, a first random access request message, wherein the first resource is a part of a second resource that enables a second terminal device to send, using the second resource, a second random access request message;
    receiving a random access response message for scheduling a third resource, wherein a first bandwidth of the third resource is less than or equal to a first channel bandwidth of the first terminal device, wherein the first channel bandwidth is less than or equal to a second channel bandwidth of the second terminal device, and wherein the second channel bandwidth is greater than or equal to a second bandwidth configured by a network device; and
    sending, using the third resource, a first random access message.

2. The communication method of claim 1, wherein the third resource is a part of a fourth resource that enables the second terminal device to send, using the fourth resource, the second random access message, and wherein a third bandwidth of the fourth resource is less than or equal to the second bandwidth.

3. The communication method of claim 1, further comprising receiving third configuration information from the network device, wherein the third configuration information is used for configuring:
    N random access occasions, wherein a fourth bandwidth of a fifth resource that is corresponding to each of the N random access occasions and that is used for receiving the first random access message is less than or equal to the first channel bandwidth;
    M random access resources, wherein a fifth bandwidth of a sixth resource that is corresponding to each of the M random access resources and that is used for receiving the first random access message is less than or equal to the first channel bandwidth; or
    K random access resources corresponding to H random access occasions, wherein the H random access occasions belong to P random access occasions, wherein a sixth bandwidth of a seventh resource that is corresponding to each of the K random access resources and that is used for receiving the first random access message is less than or equal to the first channel bandwidth,
    wherein N, M, K, H, and P are integers greater than or equal to 1, and wherein H is less than or equal to P.

4. The communication method of claim 1, further comprising receiving, from the network device, a first downlink message comprising first configuration information of the first terminal device, wherein the first configuration information is for configuring a parameter.

5. The communication method of claim 4, wherein the first configuration information comprises second configuration information of a bandwidth part (BWP), and wherein a third bandwidth of the BWP is less than or equal to the first channel bandwidth.

6. The communication method of claim 4, wherein the first resource, the third resource, first information from the first random access message, or first information from a first uplink message sent to the network device enables the network device to determine the parameter, and wherein the first information comprises first type information of the first terminal device or second type information of a service supported by the first terminal device.

7. A communication apparatus being a first terminal device or a chip in a first terminal device, comprising:
    a non-transitory memory storage configured to store instructions; and
    a processor in communication with the non-transitory memory storage and configured to execute the instructions to cause the communication apparatus to:
        send, using a first resource, a first random access request message, wherein the first resource is a part of a second resource that enables a second terminal device to send, using the second resource, a second random access request message;
        receive a random access response message for scheduling a third resource, wherein a first bandwidth of the third resource is less than or equal to a first channel bandwidth of the first terminal device, wherein the first channel bandwidth is less than or equal to a second channel bandwidth of the second terminal device, and wherein the second channel bandwidth is greater than or equal to a second bandwidth configured by a network device; and
        send, using the third resource, a first random access message.

8. The communication apparatus of claim 7, wherein the third resource is a part of a fourth resource that enables the second terminal device to send, using the fourth resource, the second random access message, and wherein a third bandwidth of the fourth resource is less than or equal to the second bandwidth.

9. The communication apparatus of claim 7, wherein the processor is further configured to execute the instructions to cause the communication apparatus to receive third configuration information from the network device, and wherein the third configuration information is used for configuring:
    N random access occasions, wherein a fourth bandwidth of a fifth resource that is corresponding to each of the N random access occasions and that is used for receiving the first random access message is less than or equal to the first channel bandwidth;
    M random access resources, wherein a fifth bandwidth of a sixth resource that is corresponding to each of the M random access resources and that is used for receiving the first random access message is less than or equal to the first channel bandwidth; or
    K random access resources corresponding to H random access occasions, wherein the H random access occasions belong to P random access occasions, wherein a sixth bandwidth of a seventh resource that is corresponding to each of the K random access resources and that is used for receiving the first random access message is less than or equal to the first channel bandwidth, wherein N, M, K, H, and P are integers greater than or equal to 1, and wherein H is less than or equal to P.

10. The communication apparatus of claim 7, wherein the processor is further configured to execute the instructions to cause the communication apparatus to receive, from the network device, a first downlink message comprising first configuration information of the first terminal device, and wherein the first configuration information is for configuring a parameter.

11. The communication apparatus of claim 10, wherein the first configuration information comprises second configuration information of a bandwidth part (BWP), and wherein a third bandwidth of the BWP is less than or equal to the first channel bandwidth.

12. The communication apparatus of claim 10, wherein the first resource, the third resource, first information from the first random access message, or first information from a first uplink message sent to the network device enables the network device to determine the parameter, and wherein the first information comprises first type information of the first terminal device or second type information of a service supported by the first terminal device.

13. A communication apparatus being a network device or a chip in a network device, comprising:
 a non-transitory memory storage configured to store instructions; and
 a processor in communication with the non-transitory memory storage and configured to execute the instructions to cause the communication apparatus to:
  receive, from a first terminal device and using a first resource, a first random access request message, wherein the first resource is a part of a second resource that enables the second terminal device to send, using the second resource, a second random access request message;
  send a random access response message for scheduling a third resource, wherein a first bandwidth of the third resource is less than or equal to a first channel bandwidth of the first terminal device, wherein the first channel bandwidth is less than or equal to a second channel bandwidth of the second terminal device, and wherein the second channel bandwidth is greater than or equal to a second bandwidth configured by a network device; and
  receive, from the first terminal device and using the third resource, a first random access message.

14. The communication apparatus of claim 13, wherein the processor is further configured to execute the instructions to cause the communication apparatus to send, to the first terminal device, a first downlink message comprising first configuration information of the first terminal device, wherein the first configuration information is for configuring a parameter, wherein the first configuration information comprises second configuration information of a bandwidth part (BWP), and wherein a third bandwidth of the BWP is less than or equal to the first channel bandwidth.

15. The communication apparatus of claim 14, wherein the processor is further configured to execute the instructions to cause the communication apparatus to determine the parameter based on the first resource, the third resource, first information from the first random access message, or first information from a first uplink message received from the first terminal device, and wherein the first information comprises first type information of the first terminal device or second type information of a service supported by the first terminal device.

16. The communication apparatus of claim 15, wherein the service comprises an industrial sensor service.

17. The communication apparatus of claim 15, wherein the service comprises a wearable service.

18. The communication apparatus of claim 15, wherein the service comprises a monitoring service.

19. The communication apparatus of claim 13, wherein the processor is further configured to execute the instructions to cause the communication apparatus to send third configuration information to the first terminal device, and wherein the third configuration information is used for configuring:
 N random access occasions, wherein a fourth bandwidth of a fifth resource that is corresponding to each of the N random access occasions and that is used for sending the first random access message is less than or equal to the first channel bandwidth;
 M random access resources, wherein a fifth bandwidth of a sixth resource that is corresponding to each of the M random access resources and that is used for sending the first random access message is less than or equal to the first channel bandwidth; or
 K random access resources corresponding to H random access occasions, wherein the H random access occasions belong to P random access occasions, wherein a sixth bandwidth of a seventh resource that is corresponding to each of the K random access resources and that is used for sending the first random access message is less than or equal to the first channel bandwidth, wherein N, M, K, H, and P are integers greater than or equal to 1, and wherein H is less than or equal to P.

20. The communication apparatus of claim 13, wherein the third resource is a part of a fourth resource that enables the second terminal device to send, using the fourth resource, the second random access message, and wherein a third bandwidth of the fourth resource is less than or equal to the second bandwidth.

* * * * *